(12) United States Patent
Banerjee et al.

(10) Patent No.: US 11,156,525 B2
(45) Date of Patent: Oct. 26, 2021

(54) EGRESS POINT LOCALIZATION

(71) Applicant: Phyn LLC, Torrance, CA (US)

(72) Inventors: Salil P. Banerjee, Lynchburg, VA (US); Brady C. Houston, Bothell, WA (US); Babak Abbasi Bastami, Seattle, WA (US); Ryan Yong Kim, Rolling Hills Estates, CA (US); Shwetak N. Patel, Seattle, WA (US)

(73) Assignee: Phyn LLC, Torrance, CA (US)

( * ) Notice: Subject to any disclaimer, the term of this patent is extended or adjusted under 35 U.S.C. 154(b) by 146 days.

(21) Appl. No.: 16/230,775

(22) Filed: Dec. 21, 2018

(65) Prior Publication Data

US 2019/0204177 A1    Jul. 4, 2019

Related U.S. Application Data

(60) Provisional application No. 62/611,187, filed on Dec. 28, 2017.

(51) Int. Cl.
  *G01M 3/28* (2006.01)
  *G01M 3/26* (2006.01)
  *E03B 7/07* (2006.01)

(52) U.S. Cl.
  CPC .......... *G01M 3/2815* (2013.01); *E03B 7/071* (2013.01); *G01M 3/26* (2013.01)

(58) Field of Classification Search
  CPC ...... G08B 21/20; G01M 3/2815; G01M 3/04; G01M 3/243
  See application file for complete search history.

(56) References Cited

U.S. PATENT DOCUMENTS 3,739,089 A    6/1973  Latall
6,247,353 B1 *  6/2001  Battenberg ............ G01H 1/003
                                                73/40.5 A (Continued)

FOREIGN PATENT DOCUMENTS

WO      2010/14410 A1   12/2010

OTHER PUBLICATIONS

Invitation to Pay Additional Fees dated Jun. 13, 2019 in PCT/US2018/067486, 11 pages.

(Continued)

*Primary Examiner* — Herbert K Roberts
*Assistant Examiner* — Fatemeh Esfandiari Nia
(74) *Attorney, Agent, or Firm* — Kilpatrick Townsend & Stockton LLP

(57) ABSTRACT

A system for determining a location of an egress point in a plumbing system that includes a branched system of pipes within a building is provided. The system includes a first sensor that is configured to measure a first pressure signal as a function of time at a first location within the plumbing system, and a second sensor that is configured to measure a second pressure signal as a function of time at a second location within the plumbing system. The plumbing system includes multiple branch points between the first location and the second location. The system also includes a processor that is configured to determine a temporal difference between a first pressure drop in the first pressure signal and a second pressure drop in the second pressure signal, and use the temporal difference to determine an estimated location of the egress point in the plumbing system.

15 Claims, 19 Drawing Sheets

(56) References Cited

U.S. PATENT DOCUMENTS

| | | | |
|---|---|---|---|
| 9,285,290 B2 | 3/2016 | Chatzigeorgiou | |
| 9,772,251 B2 | 9/2017 | Shinoda et al. | |
| 10,094,095 B2 | 10/2018 | Enev et al. | |
| 2010/0313958 A1* | 12/2010 | Patel | G01F 1/34 |
| | | | 137/1 |
| 2011/0227721 A1 | 9/2011 | Mezghani et al. | |
| 2012/0255343 A1 | 10/2012 | Sarma et al. | |
| 2012/0285221 A1 | 11/2012 | Al-Qahtani et al. | |
| 2014/0028459 A1* | 1/2014 | Solomon | G08B 21/18 |
| | | | 340/605 |
| 2014/0229124 A1* | 8/2014 | Albertao | G01F 1/34 |
| | | | 702/47 |
| 2016/0223120 A1 | 8/2016 | Gagliardo | |
| 2017/0030528 A1* | 2/2017 | Dietzen | G08B 21/20 |
| 2017/0131174 A1 | 5/2017 | Enev et al. | |
| 2017/0198854 A1 | 7/2017 | Gagliardo | |
| 2017/0328522 A1* | 11/2017 | Battaglini | H04L 67/12 |
| 2018/0127957 A1 | 5/2018 | Enev et al. | |

OTHER PUBLICATIONS

Bandes et al, Detecting Underground Leaks with Ultrasonics, *Maintenance Journal*. May-Jun. 2000—vol. 18, No. 3.
Bandes, Detect Leaks with Ultrasound, *Chemical Engineering*. Dec. 2002. www.CHE.com, pp. 67-70.
U.S. Appl. No. 62/611,187, filed Dec. 28, 2017, all pages.
U.S. Appl. No. 15/818,562, filed Nov. 20, 2017, all pages.
International Search Report and Written Opinion dated Aug. 5, 2019 in PCT/US2018/067486, all pages.

\* cited by examiner

EGRESS POINT LOCALIZATION

CROSS-REFERENCE TO RELATED APPLICATION

This application claims priority to U.S. Provisional Patent Application No. 62/611,187, filed on Dec. 28, 2017, entitled "PORTABLE DEVICE FOR WATER ANALYSIS," the disclosure of which is hereby incorporated by reference in its entirety for all purposes.

BACKGROUND

This disclosure relates in general to systems and methods for determining the location of an egress point in a pipe.

Homes and commercial buildings have water distributed by pipe systems that can be very complex with many junctions and branches. Often it may be determined that there is an unintentional egress point, or a leak, somewhere within the plumbing system, but it may be difficult to identify the location of the leak, so that the leak can be repaired in a timely manner. Without a detailed map of the plumbing system, it may be necessary to remove drywall in various areas of the building until the leak can be found by visual inspection. This may result in significant additional costs to replace and paint the drywall once the leak has been repaired. Further, it may be useful to determine the location of an intentional egress point, such as the opening of a fixture to allow water to flow out of the fixture.

Many buildings have small leaks that go undetected for months and years that causes water loss and air quality issues. Water is a precious commodity in drought stricken climates with a large percentage lost before it reaches our sinks, showers and swimming pools. Toxic mold causes adverse reactions with the occupants of buildings. Mold is generally in the environment waiting for a source of moisture to thrive and develop reproductive spores. Those spores cause much of the irritation and destroy air quality. Without mechanisms to detect inadvertent liquid egress, mold will continue to capitalize on a favorable habitat.

SUMMARY

Exemplary embodiments of the invention provide systems and methods for determining a location of an egress point in a plumbing system that includes a branched system of pipes within a building. According to an aspect of the invention, a system includes a first sensor that is configured to measure a first pressure signal as a function of time at a first location within the plumbing system, and a second sensor that is configured to measure a second pressure signal as a function of time at a second location within the plumbing system. The plumbing system includes multiple branch points between the first location and the second location. The system also includes a processor that is configured to determine a temporal difference between a first pressure drop in the first pressure signal and a second pressure drop in the second pressure signal, and use the temporal difference to determine an estimated location of the egress point in the plumbing system.

The system may also include a portable microphone that is configured to measure an audio signal by scanning an area that encompasses the estimated location of the egress point. The processor may be further configured to use the audio signal to modify the estimated location of the egress point.

The system may also include a transducer that is configured to apply an ultrasonic signal to a pipe within the plumbing system, and a portable microphone that is configured to measure an alteration of the ultrasonic signal that propagates through the egress point by scanning an area that encompasses the estimated location of the egress point. The processor may be further configured to use the alteration of the ultrasonic signal to modify the estimated location of the egress point.

The system may also include a portable scanner that is configured to measure an infrared signal by scanning an area that encompasses the estimated location of the egress point. The processor may be further configured to use the infrared signal to modify the estimated location of the egress point.

The estimated location of the egress point may be between a first fixture and a second fixture within the plumbing system, and the egress point may correspond to a leak in a pipe. Alternatively, the estimated location of the egress point may correspond to a location of a fixture within the plumbing system. The estimated location of the egress point may be determined by comparing the temporal difference with a database of calibrated temporal differences for a plurality of fixtures within the plumbing system.

According to another aspect of the invention, a method for determining a location of an egress point in a plumbing system that includes a branched system of pipes within a building is provided. According to yet another aspect of the invention, a machine-readable medium for determining a location of an egress point in a plumbing system that includes a branched system of pipes within a building is provided.

According to an additional aspect of the invention, a portable device for analyzing water in a plumbing system is provided. The portable device includes a pipe; an adapter that is configured to connect the pipe with an output of a water source within the plumbing system; at least one sensor that is configured to measure information about water within the pipe; a processor that is configured to analyze the information from the at least one sensor; and a transceiver that is configured to receive the information from the processor and transmit the information to at least one of a network, a cloud analyzer, or a user device.

The water source may include a faucet, a spout, a shower head, an aerator, and/or an outdoor spigot. The portable device may also include a one-way valve that is configured to regulate water flow into the pipe from the water source; a water level sensor that is configured to detect when the pipe is filled with the water; and a shutoff valve that is configured to prevent the water from exiting the pipe. Alternatively or in addition, the portable device may also include a temperature sensor that is configured to measure a temperature of the water within the pipe, and a pressure sensor that is configured to measure a pressure of the water within the pipe. The processor may be further configured to detect a leak in the plumbing system by analyzing the temperature and/or the pressure of the water within the pipe.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
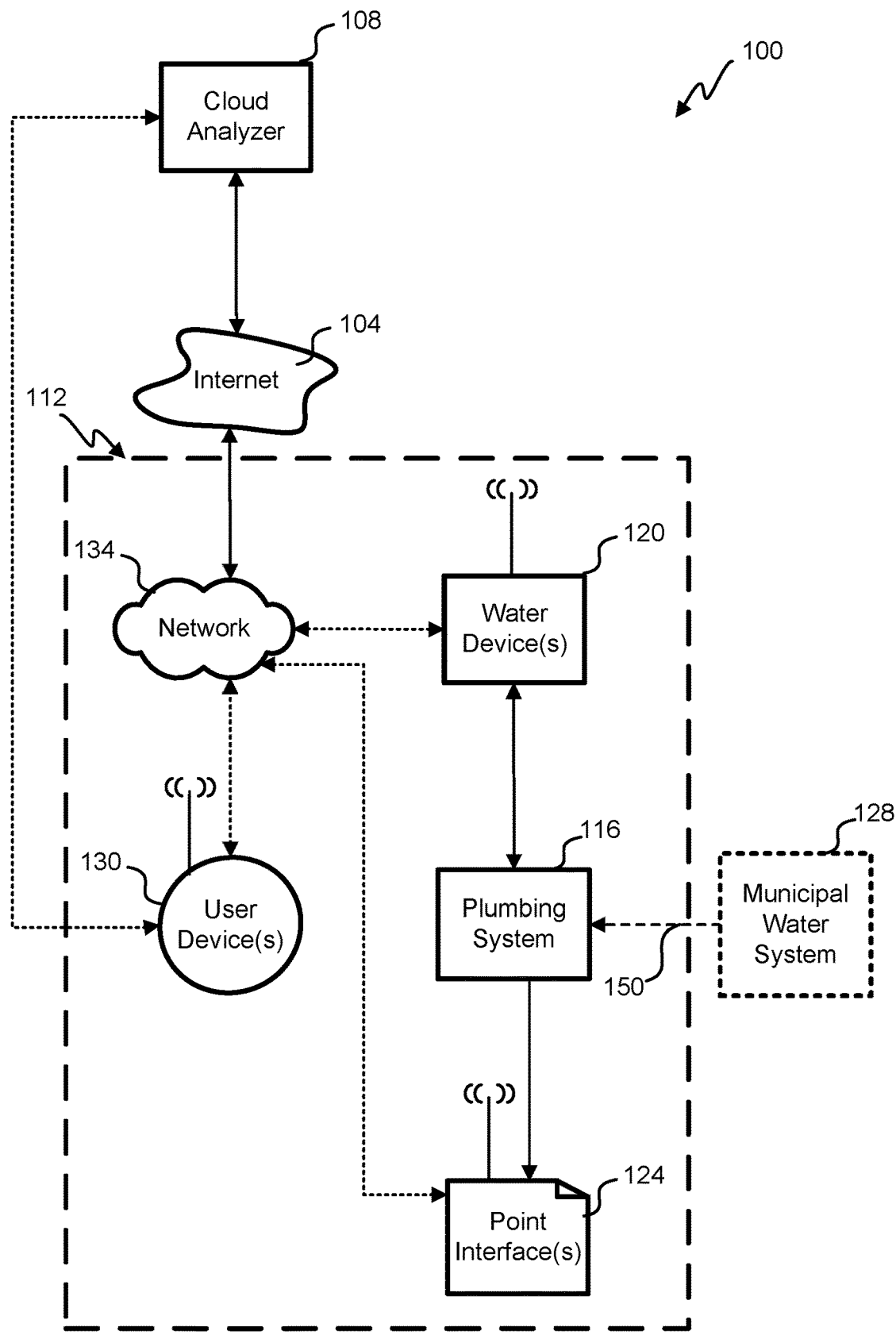
FIG. 1 depicts a block diagram of an embodiment of a water analysis system.

Referring first to FIG. 1, a block diagram of an embodiment of a water analysis system 100 is shown. The municipal water system 128 is connected to the building 112 with a water main 150, but other embodiments could source their water from a well, a cistern, a tank, or any other source. Different water sources may use different flow and leak detection algorithms.

The water from the municipal water system 128 has a temperature that varies relatively slowly since they are typically delivered via pipes which are buried underground. With the ground acting as a heat sink there is less variation in temperature as compared to the atmospheric temperature. The temperatures of municipal water systems 128 vary slightly from around 40 to 55° F. (4 to 13° C.). Such temperature changes are dependent upon well depth and aboveground storage facilities. Surface water temperatures vary with seasonal change from around 40 to 80° F. (4 to 27° C.) with even higher temperatures in the deep South and Southwest of the United States for example. It can be said that the municipal water system 128 temperature remains relatively stable during a given season for a given location (temperature varies from 38° F. in Anchorage, Ak. to 82° F. in Phoenix, Ariz.). The temperature changes seen in the plumbing system 116 are due to water flowing through the pipes and can help detect small unintended water usages or leaks continuously without engaging the shut-off-valve or other techniques that actively engage the plumbing system as described in application Ser. No. 15/344,458, entitled "SYSTEM AND METHOD FOR LEAK CHARACTERIZATION AFTER SHUTOFF OF PRESSURIZATION SOURCE," filed on Nov. 4, 2016, which is incorporated by reference for all purposes.

When water is stagnant or unmoving in the pipes (i.e., there is no intentional water egress or leaks) the temperature of water varies based on the temperature of where the water device 120 is installed and the temperature of the municipal water system 128 entering the building. Where the water device 120 is installed inside a building, for example, the temperature will stabilize at the ambient temperature typically regulated by a HVAC thermostat. On the other hand, if the water device 120 is placed outdoors it will vary as the weather changes over the course of the day. For small flows that are not detected by conventional flow sensors, there is a change in the temperature noted by the water device 120. Depending on the rate of water flow, the temperature measured by the water device 120 stabilizes at a certain temperature that is between the temperature of the municipal water system 128 and the temperature the plumbing system is exposed to in the building 112.

Remote from the building 112 over the Internet 104 is a cloud analyzer 108 that is in communication with various buildings and user devices 130. User account information, sensor data, local analysis, municipal water usage information for the building 112 is passed to the cloud analyzer 108. User devices 130 may connect with the water device 120 and the cloud analyzer through a local network 134 and/or a cellular network. The water device 120 can have an Ethernet, a broadband over power line, a WiFi, Bluetooth, and/or a cellular connection coupled to the cloud analyzer 108. Some embodiments include a gateway or peer node that the water device can connect to that is coupled to the network 134 and/or Internet 104 using WiFi, Bluetooth, Zigbee, or other short range wireless signals. Generally, there is a gateway or firewall between the network 134 and the Internet 104. Where there are multiple water devices 120 they can communicate directly with each other or through the network 134 or other LAN/WAN.

Within the building 112, the plumbing system 116 is a collection of pipes connected to appliances and fixtures all coupled to the water main 150. A building 112 may have one or more water device(s) 120 in fluid communication with the plumbing system 116. A water device 120 may be coupled to the cold and/or hot water pipe at a particular location, or coupled to any accessible faucet or other source of water, and wirelessly or wire communicates with the network 134. Different water devices 120 may have different configurations with more or less sensors and processing capabilities. Some water devices 120 have only peer communication with other water devices 120 while others have LAN and/or WAN capabilities.

Pressure in the plumbing system can be analyzed with the water device 120 along with temperature, flow, sound, etc. The municipal water system 128 is pressurized so that the plumbing fixtures dispense water when opened. The water main 150 into the building is typically at 80-120 psi. Most buildings buffer the water main pressure with a pressure reducing valve (PRV) to lower the pressure to 40-70 psi, which also isolates noise seen with sensors when connected directly to the water main 150. Within the building 112, temperature and pressure are stabilize at a given rate of flow caused by leak or intentional egress from the plumbing system 116. Measuring with various sensors at the water device 120 allows detecting egress even for situations with a conventional flow sensor cannot perceive any usage.

The water device(s) 120 uses different techniques to find very small leaks in the plumbing system 116 that are not detected by a conventional flow sensor. For example, turbine flow meters do not sense below 0.7 gpm and ultrasonic flow sensors have resolution down to 0.1-0.2 gpm. Statistical approaches and signal processing techniques process temperature, pressure and/or other sensor readings for the leak detection by relying on variations of the temperature signal to provide first insights into the possibility of a leak with pressure and/or flow sensing optionally assisting in validating the likelihood of a leak in the plumbing system 116. Embodiments allow detection of leaks below 0.7 gpm and as low as 0.06 gpm in various embodiments.

One or more point interface(s) 124 may or may not be in fluid communication with the plumbing system, but can gather data in some embodiments such as ambient temperature, temperature outside the pipe, water pressure inside the pipe, and/or acoustic waves inside or outside the pipe. The point interfaces 124 are coupled to the network 134 to allow input and output to the user with an interface, and/or could use peer connection with other point interfaces 124 and/or water devices 120. The point interface 124 may be separate from the plumbing system 116 altogether while providing status on the water analysis system 100 such as instantaneous water usage, water usage over a time period, water temperature, water pressure, error conditions, etc. relayed from a water device 120. Error conditions such as leaks, frozen pipes, running toilets or faucets, missing or defective PRV, water bill estimates, low pressure, water heater malfunction, well pump issues, and/or other issues with the plumbing system 116 can be displayed at the point interfaces 124.

The user device 130 can be any tablet, cellular telephone, web browser, or other interface to the water analysis system 100. The water device(s) 120 is enrolled into a user account with the user device 130. Some or all of the information available at a point interface 124 can be made available to the user device using an application, app and/or browser interface. The user device 130 can wired or wirelessly connect with the water device(s) 120, cloud analyzer 108, and/or point interface(s) 124 using the LAN network 134 or a WAN network.

Figure 2:
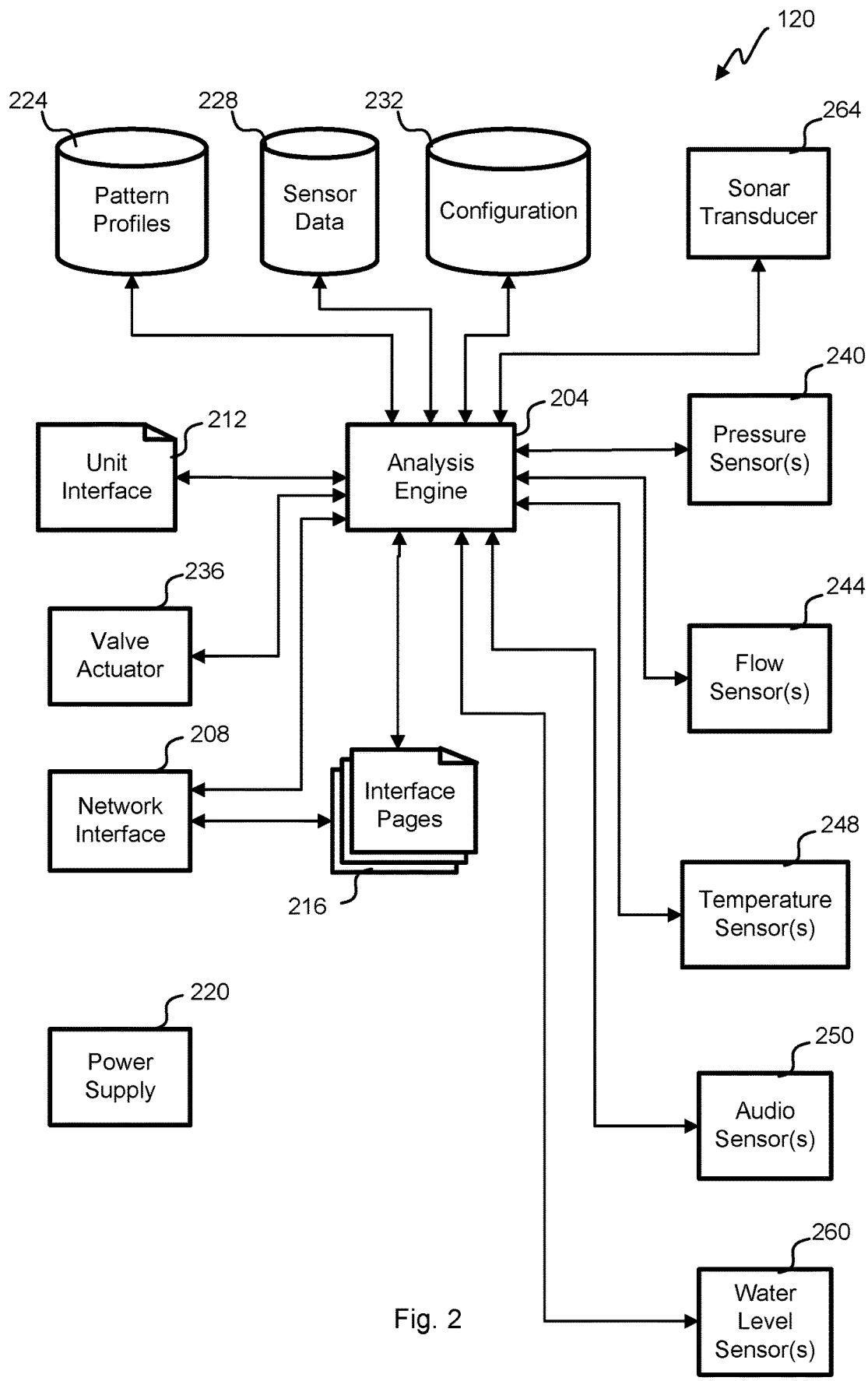
FIG. 2 depicts a block diagram of an embodiment of a water device.

With reference to FIG. 2, a block diagram of an embodiment of a water device 120 is shown. Different versions of water device 120 may have fewer components, for example, a water device 120 at an egress point or fixture may only have pressure and temperature sensors 240, 248 with a network interface 208 to relay that information to another water device 120 for processing. A power supply 220 could be internal or external to the water device 120 to provide DC or AC power to the various circuits. In some embodiments, a replaceable battery provides power while other embodiments use the water pressure to drive a turbine that recharges a battery to provide power without using grid power.

Some water devices 120 include a valve actuator 236 that operates a valve suspending flow from the water main 150. If there is a leak detected or testing is performed, the valve actuator 236 may be activated to prevent further consumption of water from the municipal water system 128. In some embodiments, the valve actuator 236 can partially constrict the water flow to change the water pressure in the building 112. Modulating the water pressure with the valve actuator 236 allows introduction of pressure waves into the plumbing system 116.

An analysis engine 204 gathers various data from the pressure sensor(s) 240, flow sensor(s) 244, temperature sensor(s) 248, and audio sensor(s) 250, sonar transducer 264, and/or water level sensor(s) 260. Interface pages 216 allow interaction with the water device 120 through a network interface 208 in a wired or wireless fashion with the user device(s) 130. The analysis engine 204 also supports a unit interface 212 that is physically part of the water device 120 to display various status, information and graphics using an OLED, LED, LCD display and/or status lights or LEDs.

Various information is stored by the water device 120, which may be reconciled with the cloud analyzer 108 in-whole or in-part using the network interface 208 coupled with the LAN network 134 or the Internet 104 using a cellular modem. Sensor data for the various sensors 240, 244, 248, 250, 260, 264 are stored in the sensor data store 228 over time to allow for longitudinal analysis. For example, several hours through several days of sensor data can be stored. The granularity of readings and length of time stored may be predefined, limited by available storage or change based upon conditions of the plumbing system 116. For example, data samples every second over a two day period could be stored, but when a leak is suspected the sample rate could increase to sixty times a second for four hours of time.

When fixtures or appliances interact with the water in the plumbing system 116, recognizable patterns occur at the water device 120. Pattern profiles 224 are stored to quickly match current sensor readings to known events. For example, a particular faucet when used may cause the flow, pressure and/or temperature sensor 244, 240, 248 readings to fluctuate in a predictable manner such that the pattern profile can be matched to current readings to conclude usage is occurring at a particular egress point. Application Ser. No. 14/937,831, entitled "WATER LEAK DETECTION USING PRESSURE SENSING," filed on Nov. 10, 2015, describes this analysis and is incorporated by reference for all purposes. The pattern profiles 224 can be in the time domain and/or frequency domain to support various condition matching by the analysis engine 204. Both intentional egress and leaks have pattern profiles 224 that are stored.

Audio patterns and sonar patterns captured respectively from the audio sensor 250 and sonar transducer 264 are also stored as pattern profiles 224. The sonar transducer 264 may also emit bursts or pulses into the water at different frequencies, amplitudes and durations stored with the other pattern profiles 224. The sonar transducer 264 can also operate as a microphone to listen to reflections of the signals sent or from other water devices 120 in lieu of the audio sensor 250 or in addition to the audio sensor 250. Some pressure sensors are sensitive to the 120 Hz or lower spectrum to also act as a sonar microphone. The audio sensor(s) 250 could be coupled to the water, pipes, appliances, fixtures, and/or ambient air in the building 112 in various embodiments.

A configuration database 232 stores information gathered for the water device 120. The Table depicts water supply parameters stored in the configuration database 232. Type of plumbing system 116 includes those without a PRV, using well water, with a working PRV, and with a non-functional PRV. The water supply to the water main 150 can be from the municipal water system 128, a well, a water tank, and/or other source. The configuration database 232 can be automatically populated using algorithms of the analysis engine 204 or manually entered by the user device 130. Different fixtures and appliances connected to the plumbing system 116 are noted in the configuration database 232 as automatically determined or entered manually.

TABLE

| | Water Supply |
|---|---|
| Field | Options |
| Type | No PRV |
| | Well water |
| | Working PRV |
| | Non-Functional PRV |
| Supply | Municipal water |
| | Well |
| | Tank. |

Figure 3:
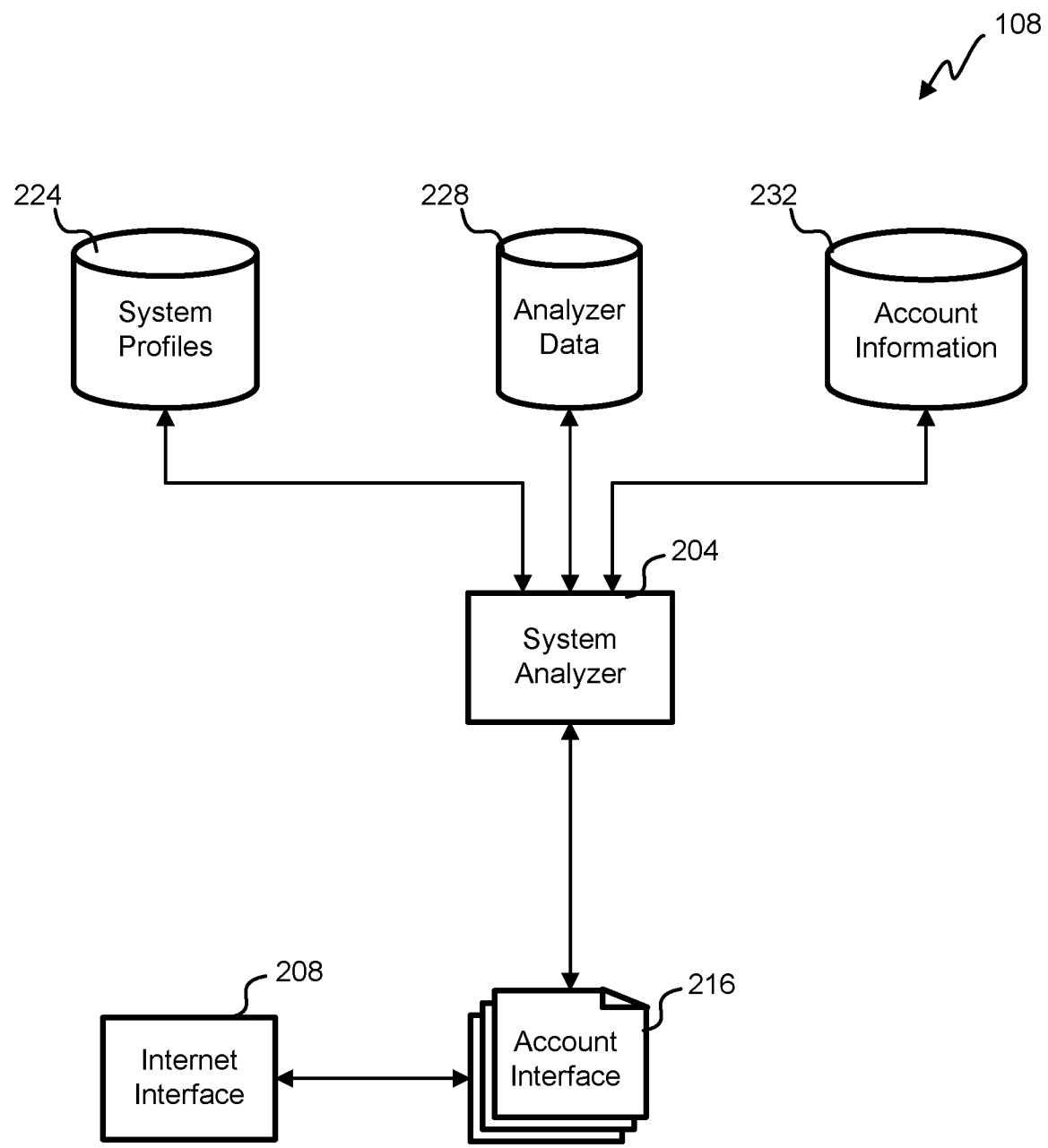
FIG. 3 depicts a block diagram of an embodiment of a cloud analyzer.

Referring next to FIG. 3, a block diagram of an embodiment of a cloud analyzer 108 is shown. The cloud analyzer 108 receives data and configuration information from many buildings 112 throughout the water analysis system 100. Each building 112 has a system profile 224 that is stored including the fixtures, appliances, water device(s) 120, point interface(s) 124, type of water supply, water source type, etc. are stored. Account information 232 including login credentials, building location, and/or user demographic information is also stored. Gathered sensor data in raw and processed form is stored as analyzer data 228 and could include usage history, specific egress events, leaks detected, fixture profiles, appliance profiles, etc.

The system analyzer 204 can process the data from each building 112 to find patterns corresponding to leaks, malfunctions, and other events that are not recognized by the water device 120 locally. By gathering sensor information from many buildings 112, the system analyzer 204 can use machine learning and big data to find very weak signals in the gathered sensor information. The system analyzer 204 can access any water device 120 or point interface 124 to test functionality, update software, and/or gather data. Where a user device 130 is coupled to the cloud analyzer 108, the system analyzer 204 receives commands to perform requested tasks from users. For example, the user device 130 can query for usage on a per fixture or appliance basis. Overall usage by the plumbing system 116 in the associated building 112 can also be determined. The system analyzer 204 can access the water utility usage and billing to provide insights into costs and overall consumption. For those utilities that provide usage information in real time, the usage and cost can be determined for each use of the plumbing system 116.

An account interface 216 allows various water devices 120 and user devices 130 to interact with the cloud analyzer 108 through an internet interface 208. The cloud analyzer 108 provides historical and real time analysis of buildings 118 a user is authorized to access. Various interaction pages of the account interface 216 allows entry of plumbing system information, configuration parameters, building location, and/or user demographic information. Various reports and status parameters are presented to the user device 130 through the account interface 216.

Figure 4:
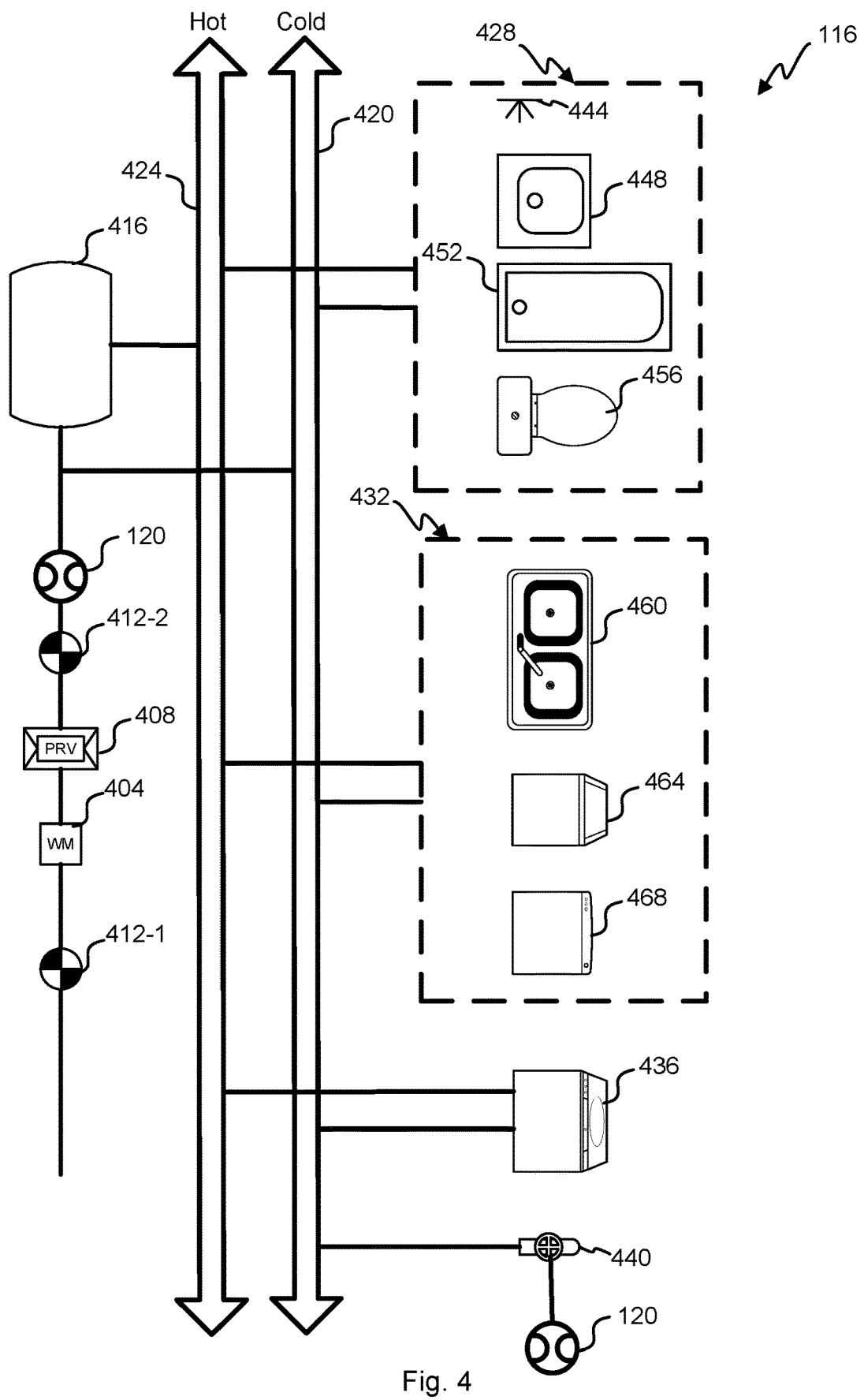
FIG. 4 depicts a block diagram of an embodiment of a plumbing system.

With reference to FIG. 4, a block diagram of an embodiment of a plumbing system 116 is shown. The municipal water system 128 is connected to a main shutoff valve 412-1 before the water main 150 passes through a water meter 404 provided by the municipality for billing purposes. The water meter 404 may be electronically or manually read to determine the bill, but some embodiments allow real time reading of the water meter 404 electronically over a WAN or LAN.

Building codes often require use of a PRV 408, but not universally. Older homes may also be missing a PRV, have one that no longer functions properly or have less than 80 psi supplied by the municipal water system 128. A building shutoff valve 412-2 is often located interior to the building 112 and provides another place to close off the water main. A water device 120 is located after the building shutoff valve 412-2, but before a water heater 416 in this embodiment. The water device 120 can be placed under the sink, near an appliance or any other location where fluid coupling is convenient with a source of power nearby.

In this example, a portion of a water line may be removed, such that the water device 120 may be installed inline with the water line. Alternatively, as discussed in further detail below, the water device 120 can be coupled to a fixture 440 through which water can flow, such as a water spigot or faucet. The hot water pipes 424 provide heated water to the building 118 and the cold water pipes 420 provide unheated water varying between the ambient temperature in the building 112 and the temperature of the municipal water system 128. The hot water pipes 424 may include a circulation pump. The hot and cold water pipes 424, 420 could branch and split in any configuration as they are fed through the walls and floors of the building 112.

This embodiment has a single bathroom 428, a kitchen 432, a washing machine 436, and a water spigot 440, but other embodiments could have more or less fixtures and appliances. The bathroom 428 has a shower 444, sink 448, bathtub 452, and toilet 456 that use water. The sink 448, bathtub 452, and shower 444 are all hooked to both the hot and cold water pipes 424, 420. The toilet 456 only requires cold water so is not hooked to the hot water pipes 424. Other buildings 112 could have any number of egress points from the plumbing system 116.

The kitchen 432 includes a two-basin sink 460, a refrigerator 464 with a liquid/ice dispenser, and a dishwasher 468. The refrigerator 464 only receives cold water 420, but the two-basin sink 460 and dishwasher 468 receive both cold and hot water pipes 420, 424. Kitchens 432 commonly include single-basin sinks and other appliances that might be coupled to the water. A typical building 112 has hundreds or thousands of pipes branching in every direction.

Figure 5:
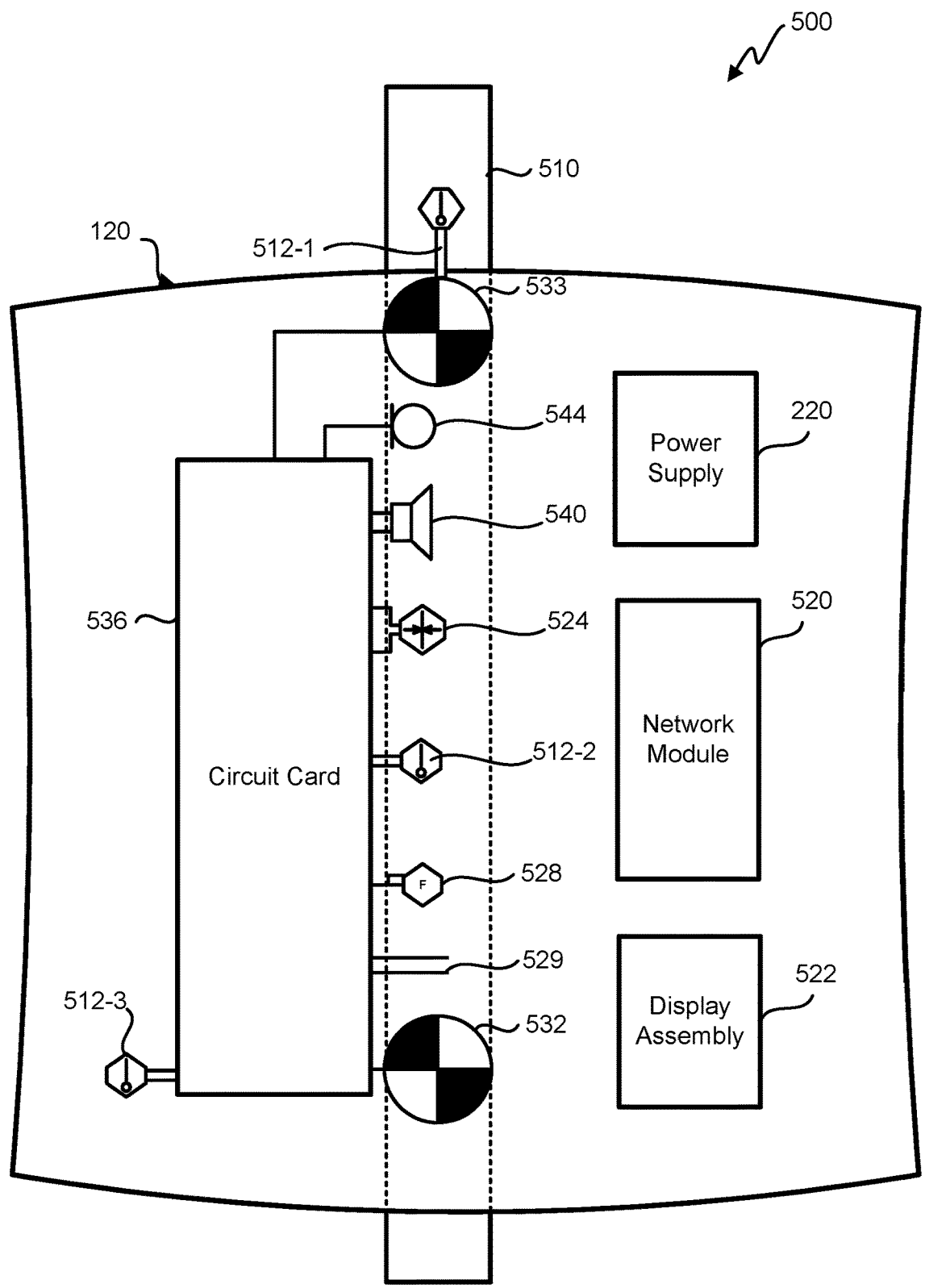
FIG. 5 depicts a block diagram of an embodiment of an installed water device.

Referring next to FIG. 5, a diagram of an embodiment of a water device 500 is shown. The water device 120 may pass water through a pipe 510 that is integral to the water device 120. The pipe 510 may be attached on both ends to either a hot or a cold water line 424, 420. Alternatively, the top of the pipe 510 may be connected to an adapter for a faucet. The integral portion of the pipe 510 could be made of copper, PVC, plastic, or other building pipe material and could be mated to the plumbing system 116 with soldered joints, glued joints, and/or detachable and flexible hoses in various embodiments.

There are several modules that make up the water device 120. A power supply 220 powers the water device 120 and could be internal or external to the enclosure. A network module 520 includes the network interface 208 to allow wired or wireless communication with the network 134 and Internet 104 to other components of the water analysis system 100. A display assembly 522 includes the unit interface 212.

Another module is the circuit card 536 which performs the processing for various sensors. Sensor information can be processed on the circuit card 536 using the analysis engine 204 and/or processed in the cloud using the system analyzer 204. Sensor information is gathered and analyzed over hours and days to find weak signals in the data indicating usage, leaks and other issues. The circuit card 536 might recognize sensor samples of interest and upload those to the cloud analyzer 108 for deep learning of the sensor data. The circuit card 536 and cloud analyzer 108 can use artificial intelligence, genetic algorithms, fuzzy logic, and/or machine learning to recognize the condition and state of the plumbing system 116.

This embodiment includes three temperature sensors 512 to measure the ambient temperature with a temperature sensor 512-3 near the outside of the enclosure and away from the internal electronics and water temperature of the water in the pipe 510 in two locations. A first temperature sensor 512-1 measures water temperature in contact with the water as it enters the pipe 510 of the water device 120 away from any heat that the various circuits might generate. A second temperature sensor 512-2 measures water temperature at a second location within the pipe 510 and away from the first temperature sensor 512-1. Based upon readings of the two water temperature sensors 512-1, 512-2, the heat generated by the water device 120 is algorithmically corrected for. A third temperature sensor 512-3 measures the ambient temperature outside of the pipe 510. Other embodiments may only use a single water temperature sensor and/or forgo the ambient temperature sensing. Ambient temperature may be measured by other equipment in the building and made available over the network 134, for example, the thermostat, smoke detectors, other water devices 120, and/or point interface(s) 124 can measure ambient temperature and provide it to other equipment in the building 112. Some embodiments could have a temperature sensor outside the building 112 or gather that information from local weather stations over the Internet 104.

This embodiment includes an electronically actuated shutoff valve 532. The shutoff valve 532 can be used to prevent flooding for leaks downstream of the water device 120. Additionally, the shutoff valve 532 can aid in detecting leaks. For example, the shutoff valve 532 and detecting a falling pressure is indicative of a leak downstream. Some embodiments can partially close the shutoff valve 532 to regulate pressure downstream. A one-way valve 533 may also be provided to regulate water flow into the pipe 510 and force it to flow in one direction.

A flow sensor 528 is used to measure the motion of water in the in the pipe 510. In this embodiment, an ultrasonic flow sensor is used, but other embodiments could use a rotameter, variable area flow meter, spring and piston flow meter, mass gas flow meters, turbine flow meters, paddlewheel sensors, positive displacement flow meter, and vortex meter. Generally, these meters and sensors cannot measure very small flows in a pipe in a practical way for building deployments. A plurality of electrodes 529 including a reference electrode and a measurement electrode may be provided within the pipe 510 to indicate a water level within the pipe 510.

This embodiment includes a sonar emitter 540 that produces sound tones, pules and/or bursts at different frequencies. A sonar microphone 544 receives sonar signals from the water in the pipe 510. Reflections from the various branches of the plumbing system 116 will produce reflections of different amplitude and delay according to the length of travel and other factors. When there are blockages in the plumbing system 116 from valves, clogs and/or frozen pipes, the echoes from the sonar emissions are received by the sonar microphone 544. Changes in the time delay between transmission and receiving of sonar signals indicate blockage or other changes in the plumping system 116. Other embodiments may combine the sonar emitter and microphone with a single sonar transducer.

The circuit card 536 is connected with a pressure sensor 524, which is coupled to the water in the pipe 510. Readings from the pressure sensor 524 are used to test the PRV 408, well pump, water supply, freeze conditions, and pipe for leaks as well as identify normal egress from the water fixtures and appliances. Pressure and temperature vary with flow such that the pressure sensor 524 and temperature sensor 512-1, 512-2 can be used to detect flow as small as tiny leaks under certain circumstances. The circuit card 536 observes trends in the sensor data, performs spectral analysis, pattern matching and other signal processing on the sensor data. Application Ser. No. 15/818,562, entitled "PASSIVE LEAK DETECTION FOR BUILDING WATER SUPPLY," filed on Nov. 20, 2017, describes how to use the water device 500 to detect and characterize small leaks, and is incorporated by reference for all purposes.

Figure 6:
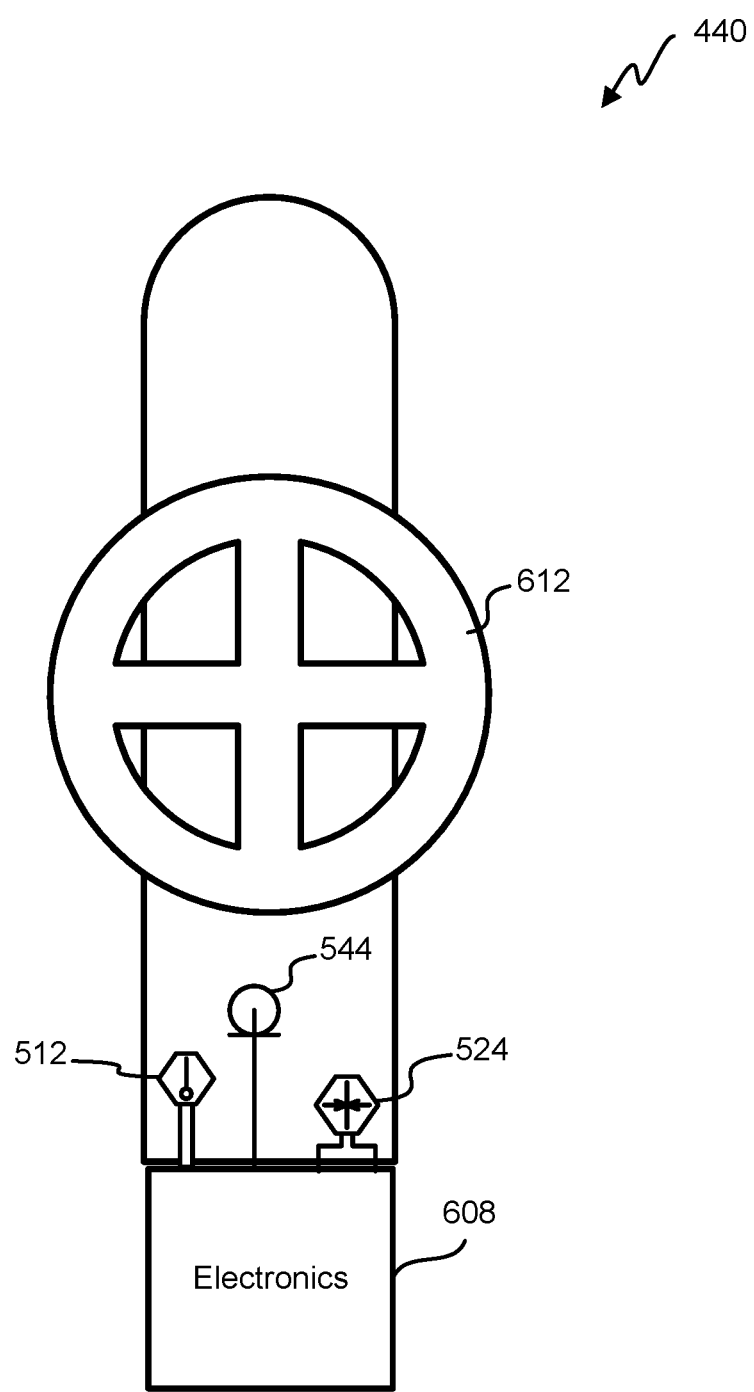
FIG. 6 depicts a block diagram of an embodiment of a water fixture that is fitted with integral sensors.

Referring next to FIG. 6, an embodiment of water fixture 440 is fitted with integral sensors to provide some of the capability of the water device of FIG. 5. An electronics module 608 includes a network interface for LAN and/or WAN communication along with circuitry to operate sensors and process or partially process the resulting readings. This embodiment includes a temperature sensor 512, pressure sensor 524 and a sonar microphone 544, but other embodiments could include more or less sensors. For example, some embodiments include a sonar emitter or a combination pressure and temperature sensor. The water fixture 440 could have other electronic features such as adjusting the egress flow to override a manual knob 612 or mixture of hot and cold water to adjust the temperature of water exiting the water fixture 440.

Figure 7:
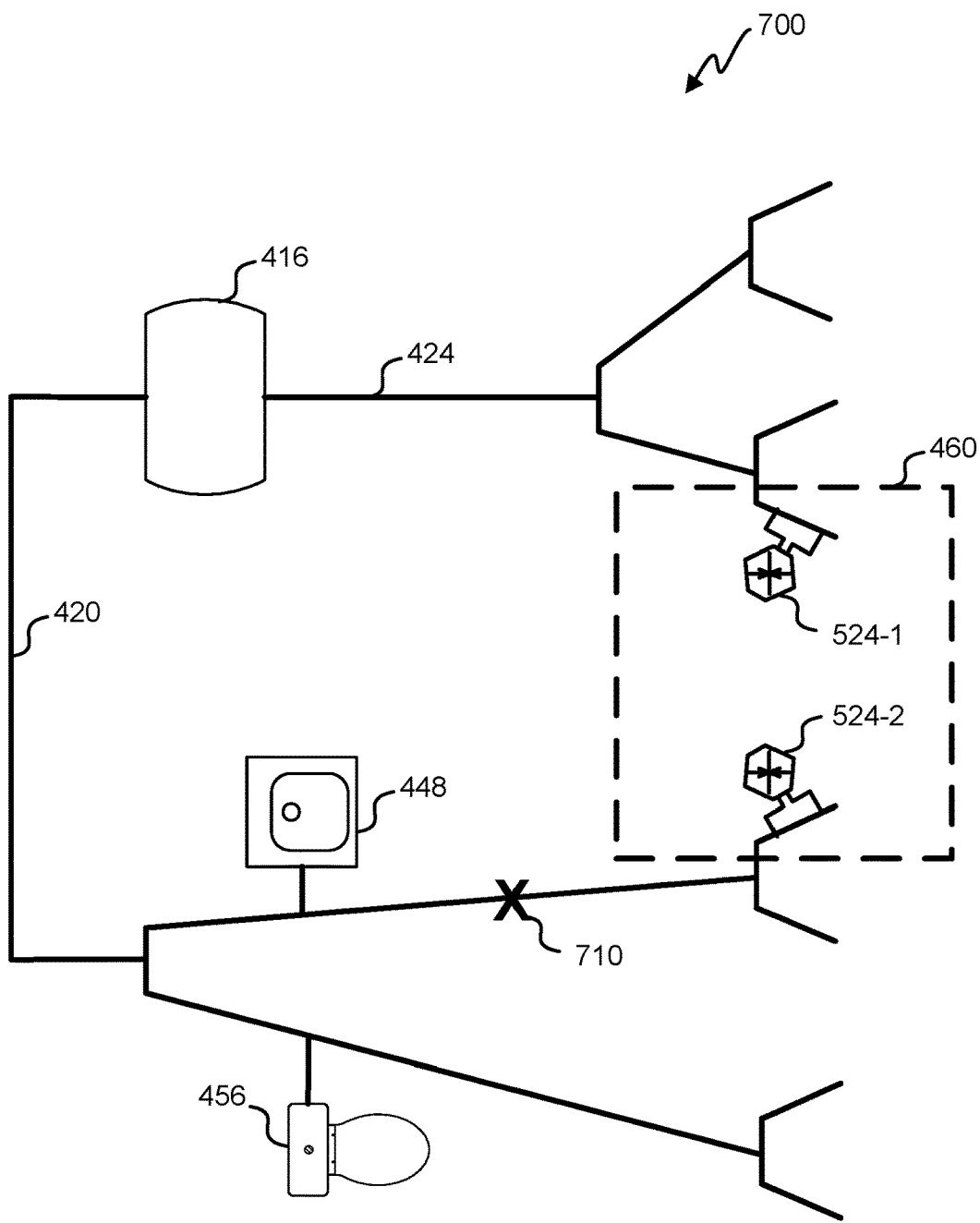
FIG. 7 depicts a block diagram of an embodiment of a plumbing system having a leak.

With reference to FIG. 7, a block diagram of an embodiment of a plumbing system 700 is shown. The plumbing system may include the water heater 416, which is coupled to the hot water pipe 424 and the cold water pipe 420. Each of the hot water pipe 424 and the cold water pipe 420 branches off throughout the plumbing system 700. For simplicity, FIG. 7 only shows a subset of the fixtures that may be included in the plumbing system 116 shown in FIG. 4. Specifically, FIG. 7 only shows the sink 460 in the kitchen 432, the toilet 456 in the bathroom 428, and the sink 448 in the bathroom 428. Although only one water device 120 is shown, the plumbing system 700 may include any number of water devices and/or water fixtures. The plumbing system 700 may also include any number of temperature sensors, pressure sensors, audio sensors, flow sensors, transducers, and/or microphones.

A first pressure sensor 524-1 may be affixed to a branch of the hot water pipe 424 underneath the sink 460 in the kitchen 432. The first pressure sensor 524-1 may be a standalone component, or may be integrated within the water device 500 or the water fixture 440. A second pressure sensor 524-2 may be affixed to a branch of the cold water pipe 420 underneath the sink 460 in the kitchen 432. The second pressure sensor 524-2 may be a standalone component, or may be integrated within the water device 500 or the water fixture 440. The first pressure sensor 524-1 and the second pressure sensor 524-2 may be affixed to any segment of the hot water pipe 424 and the cold water pipe 420, respectively. More generally, the first pressure sensor 524-1 and the second pressure sensor 524-2 may be affixed to any separate locations within the plumbing system 700, provided that there is at least one branch point between the locations. The first pressure sensor 524-1 and the second pressure sensor 524-2 may be configured to determine an estimated location of an egress point, such as a leak 710 within the plumbing system 700 or the opening of a fixture within the plumbing system 700.

Figure 8:
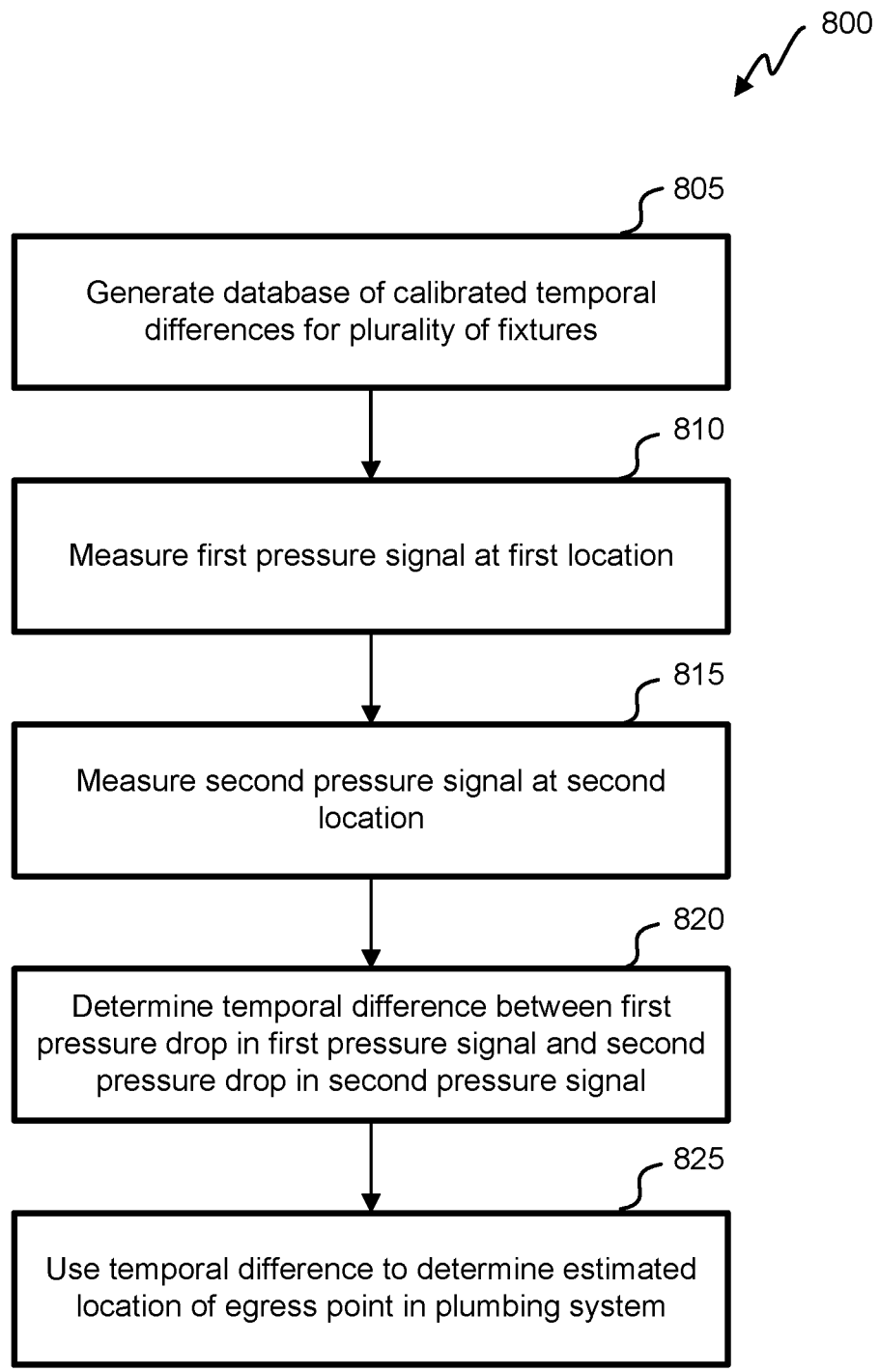
FIG. 8 depicts a flow chart of an embodiment of a method for localizing an egress point.

Referring next to FIG. 8, an embodiment of a method 800 for determining a location of an egress point in a plumbing system in shown. The method 800 begins at block 805 where a database of calibrated temporal differences for a plurality of fixtures within the plumbing system 700 is generated. In the simplified example of the plumbing system 700 shown in FIG. 7, the database may include data for the toilet 456 in the bathroom 428 and the sink 448 in the bathroom 428. However, the database may also include data for additional fixtures within the plumbing system 700, such as the fixtures that are included in the plumbing system 116 shown in FIG. 4. In general, the database may include data for any or all fixtures within a plumbing system, provided that the fixtures are connected to the hot water pipe 424 and/or the cold water pipe 420.

Referring next to FIGS. 9A-9E, examples of pressure data that may be used to generate the database of calibrated temporal differences are shown. Each graph includes a first pressure signal 905 as a function of time as measured by the first pressure sensor 524-1 for the hot water pipe 424, and a second pressure signal 910 as a function of time as measured by the second pressure sensor 524-2 for the cold water pipe 420. The events shown in each graph are generated by turning on the hot water or the cold water at various fixtures within the plumbing system 116.

Figure 9A:
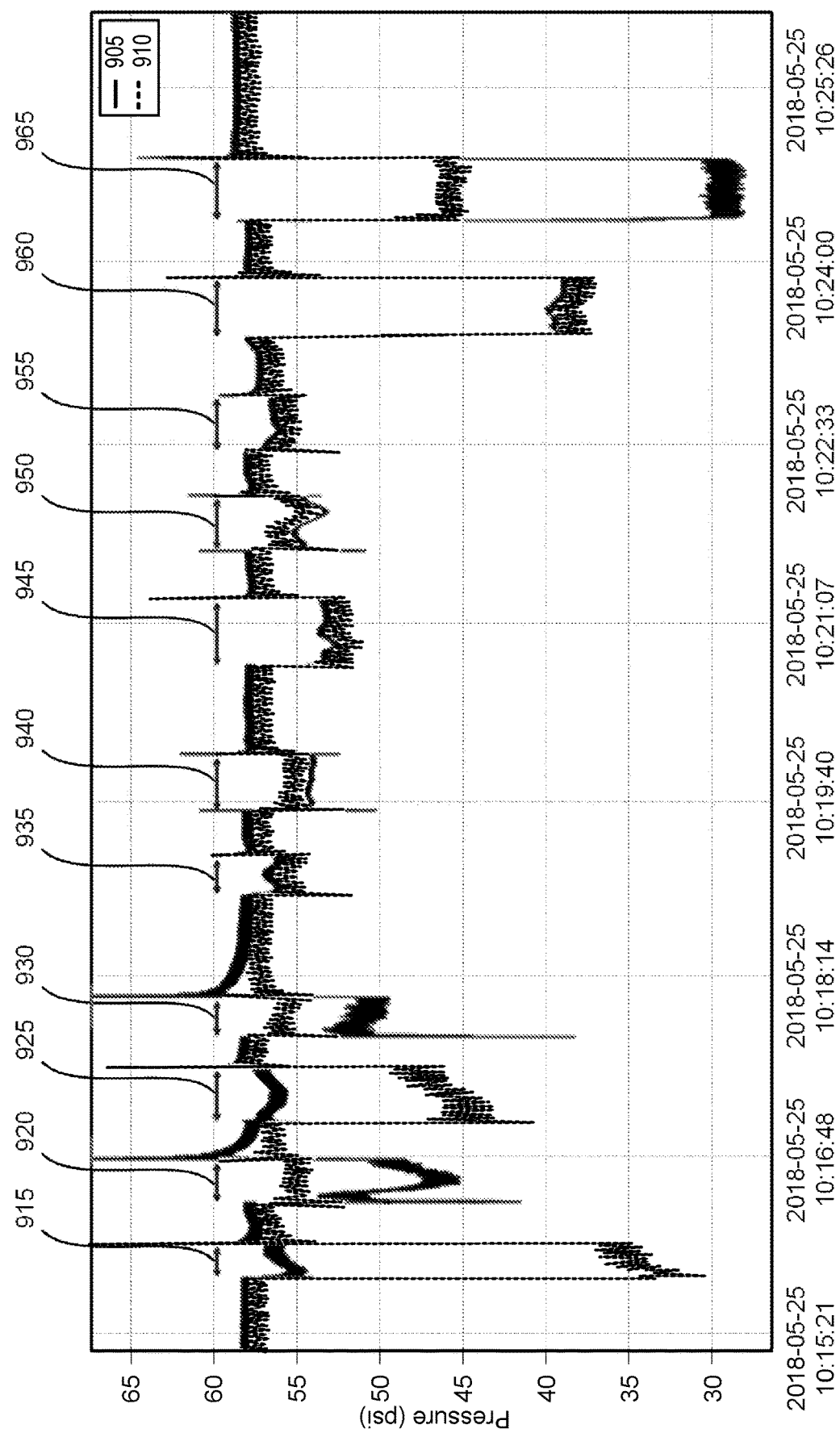
FIGS. 9A-9E depict graphs of pressure data that may be used to generate a database of calibrated temporal differences.

With reference to FIG. 9A, eleven events are shown for various fixtures within the plumbing system 116. Specifically, event 915 corresponds to turning on the cold water at the kitchen sink 460 at a flow rate of 1.8 gpm, event 920 corresponds to turning on the hot water at the kitchen sink 460 at a flow rate of 1.8 gpm, event 925 corresponds to turning on the cold water at the kitchen sink 460 at a flow rate of 1.2 gpm, event 930 corresponds to turning on the hot water at the kitchen sink 460 at a flow rate of 1.7 gpm, event 935 corresponds to turning on the cold water at the bathroom sink 448 at a flow rate of 1.5 gpm, event 940 corresponds to turning on the hot water at the bathroom sink 448 at a flow rate of 1.5 gpm, event 945 corresponds to turning on the cold water by flushing the toilet 456 at a flow rate of 3.4 gpm, event 950 corresponds to turning on the hot water at an upstairs bathroom sink (not shown) at a flow rate of 1.4 gpm, event 955 corresponds to turning on the cold water at the upstairs bathroom sink at a flow rate of 1.4 gpm, event 960 corresponds to turning on the cold water at the bathtub 452 at a flow rate of 8 gpm, and event 965 corresponds to turning on the hot water at the bathtub 452 at a flow rate of 6.2 gpm.

Figure 9B:
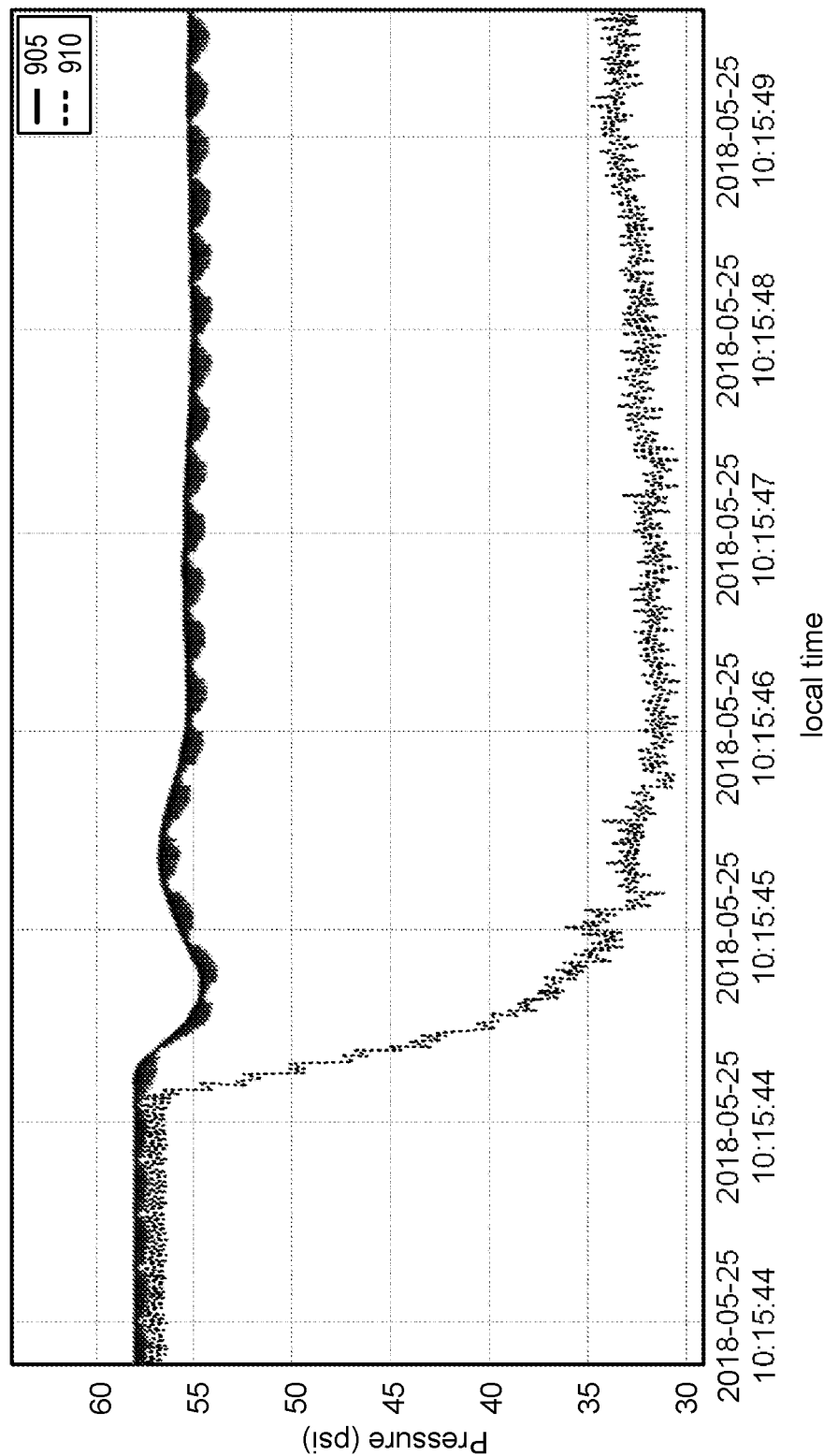

With reference to FIG. 9B, a magnified view of event 915 is shown. This view demonstrates that after the cold water is turned on at the kitchen sink 460, the second pressure signal 910 as measured by the second pressure sensor 524-2 for the cold water pipe 420 drops before the first pressure signal 905 as measured by the first pressure sensor 524-1 for the hot water pipe 424. The first pressure signal 905 and the second pressure signal 910 may be transmitted to the user device 130 and/or the water device 120, and a processor within either of these devices may determine the temporal difference between the pressure drops. The temporal difference and the conditions under which event 915 occurred may be recorded in the database of calibrated temporal differences.

Figure 9C:
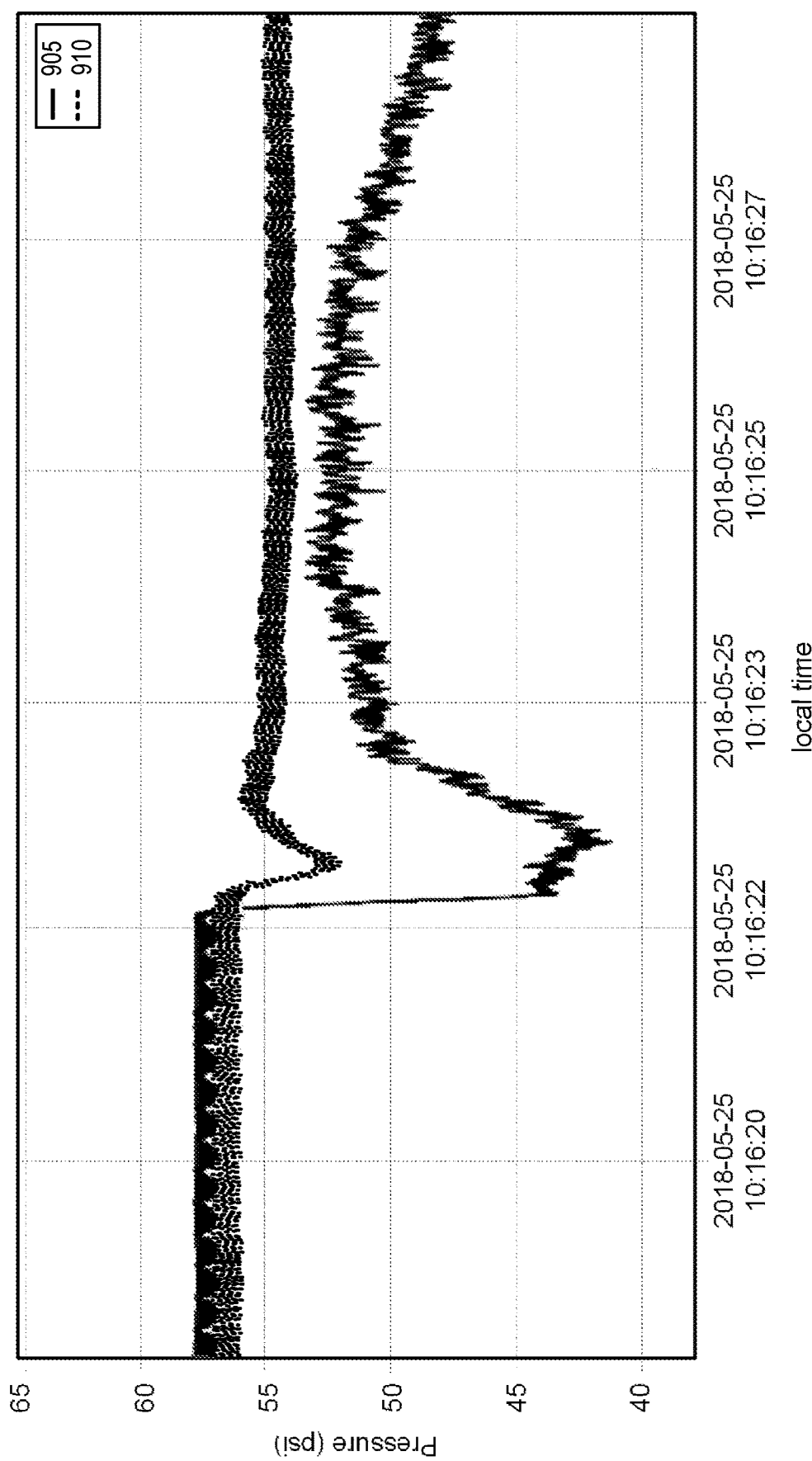

With reference to FIG. 9C, a magnified view of event 920 is shown. This view demonstrates that after the hot water is turned on at the kitchen sink 460, the first pressure signal 905 as measured by the first pressure sensor 524-1 for the hot water pipe 424 drops before the second pressure signal 910 as measured by the second pressure sensor 524-2 for the cold water pipe 420. The first pressure signal 905 and the second pressure signal 910 may be transmitted to the user device 130 and/or the water device 120, and a processor within either of these devices may determine the temporal difference between the pressure drops. The temporal difference and the conditions under which event 920 occurred may be recorded in the database of calibrated temporal differences.

Figure 9D:
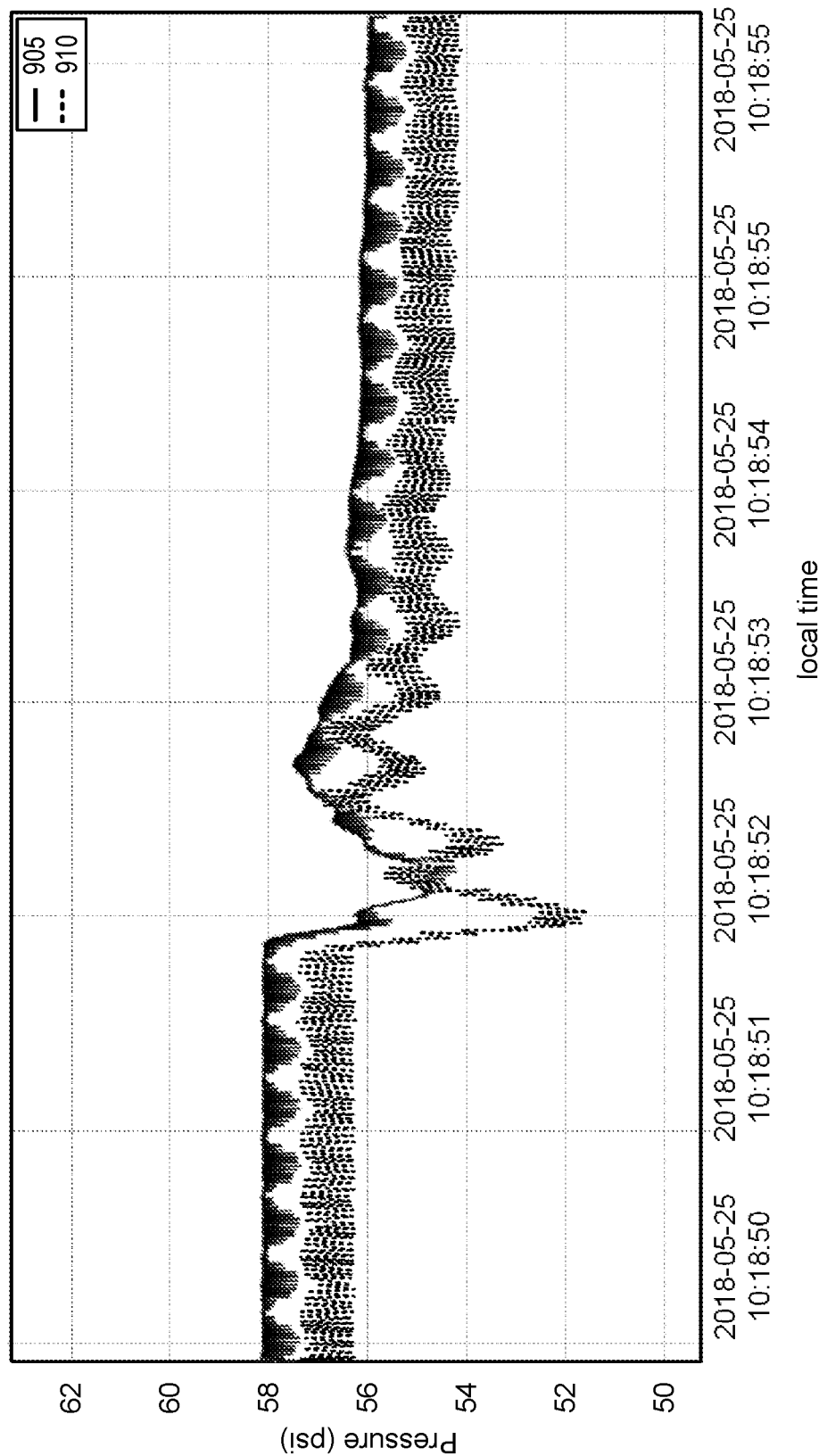

With reference to FIG. 9D, a magnified view of event 935 is shown. This view demonstrates that after the cold water is turned on at the bathroom sink 448, the second pressure signal 910 as measured by the second pressure sensor 524-2 for the cold water pipe 420 drops before the first pressure signal 905 as measured by the first pressure sensor 524-1 for the hot water pipe 424. The first pressure signal 905 and the second pressure signal 910 may be transmitted to the user device 130 and/or the water device 120, and a processor within either of these devices may determine the temporal difference between the pressure drops. The temporal difference and the conditions under which event 935 occurred may be recorded in the database of calibrated temporal differences.

Figure 9E:
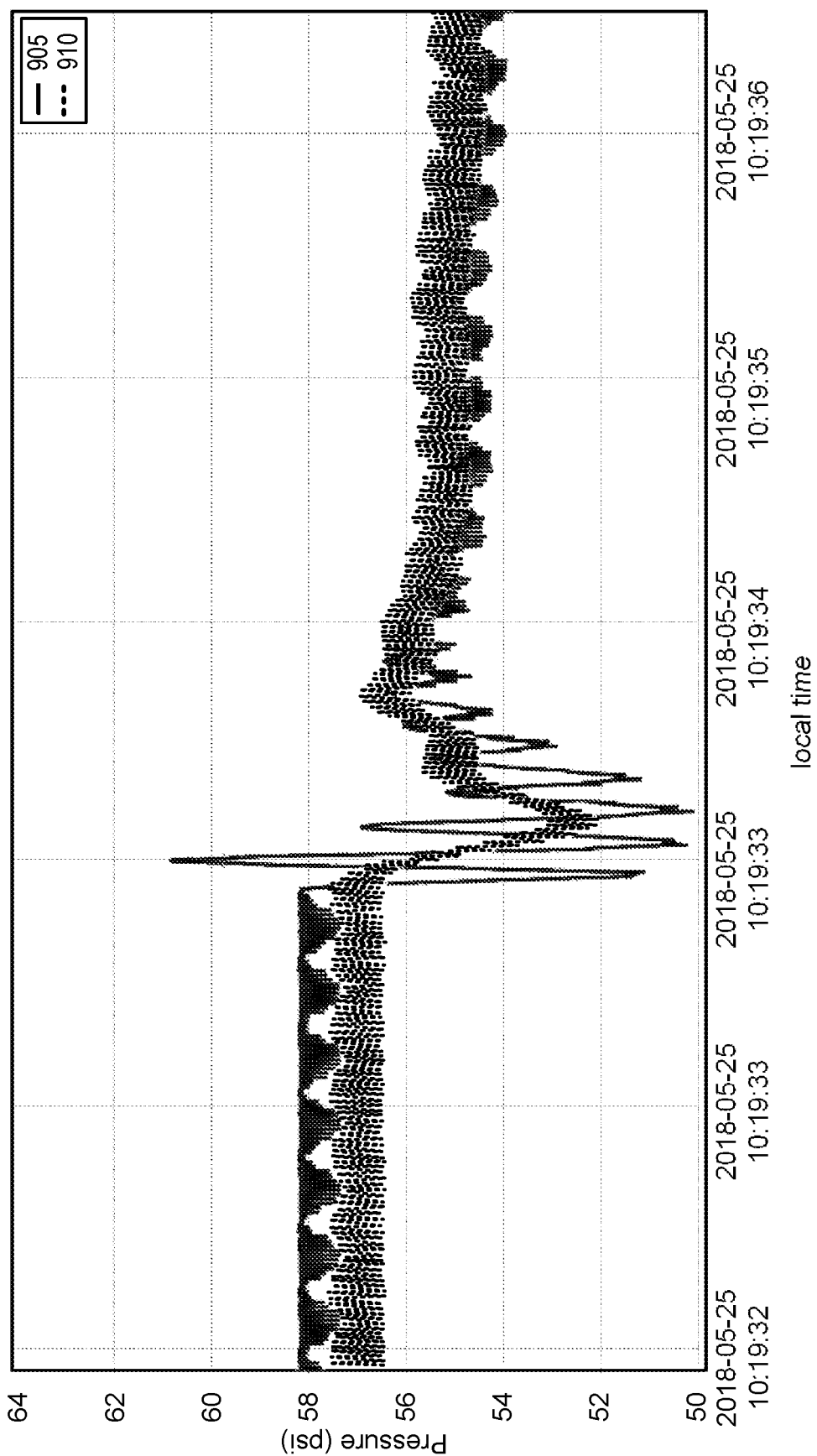

With reference to FIG. 9E, a magnified view of event 940 is shown. This view demonstrates that after the hot water is turned on at the bathroom sink 448, the first pressure signal 905 as measured by the first pressure sensor 524-1 for the hot water pipe 424 drops before the second pressure signal 910 as measured by the second pressure sensor 524-2 for the cold water pipe 420. The first pressure signal 905 and the second pressure signal 910 may be transmitted to the user device 130 and/or the water device 120, and a processor within either of these devices may determine the temporal difference between the pressure drops. The temporal difference and the conditions under which event 940 occurred may be recorded in the database of calibrated temporal differences.

The database of calibrated temporal differences may be used to determine an estimated location of an egress point in a plumbing system, such as leak 710 in plumbing system 700 or the opening of a fixture in plumbing system 700. Each temporal difference provides a unique signature for the fixture at which the corresponding event occurred. The database of calibrated temporal differences may serve as a map of the fixtures within the plumbing system 700, such that the location of a subsequent event, such as a leak, may be narrowed down by comparing its temporal difference with the calibrated temporal differences within the database.

Returning to FIG. 8, the method 800 continues by using the first pressure sensor 524-1 to measure the first pressure signal 905 for the first location, such as the hot water pipe 424, at block 810. This measurement may be performed to estimate the location of leak 710 in plumbing system 700. The method 800 also uses the second pressure sensor 524-2 to measure the second pressure signal 910 for the second location, such as the cold water pipe 420, at block 815. The first pressure signal 905 and the second pressure signal 910 may be transmitted to the user device 130 and/or the water device 120, and a processor within either of these devices may determine the temporal difference between the pressure drops at block 820. The processor may then use the measured temporal difference to determine the estimated location of leak 710 at block 825. For example, the processor may compare the measured temporal difference to the calibrated temporal differences within the database, and determine that leak 710 is occurring within one of the fixtures or between two of the fixtures. In one example, if the measured temporal difference for leak 710 is between the calibrated temporal differences for the bathroom sink 448 and the kitchen sink 460, the processor may determine that leak 710 is located within the cold water pipe 420 between the bathroom sink 448 and the kitchen sink 460. Once the estimated location of leak 710 has been determined, various methods may be used to refine the estimate, as discussed in further detail below. Alternatively, the processor may use the measured temporal difference to determine which fixture was opened at block 825.

Figure 10:
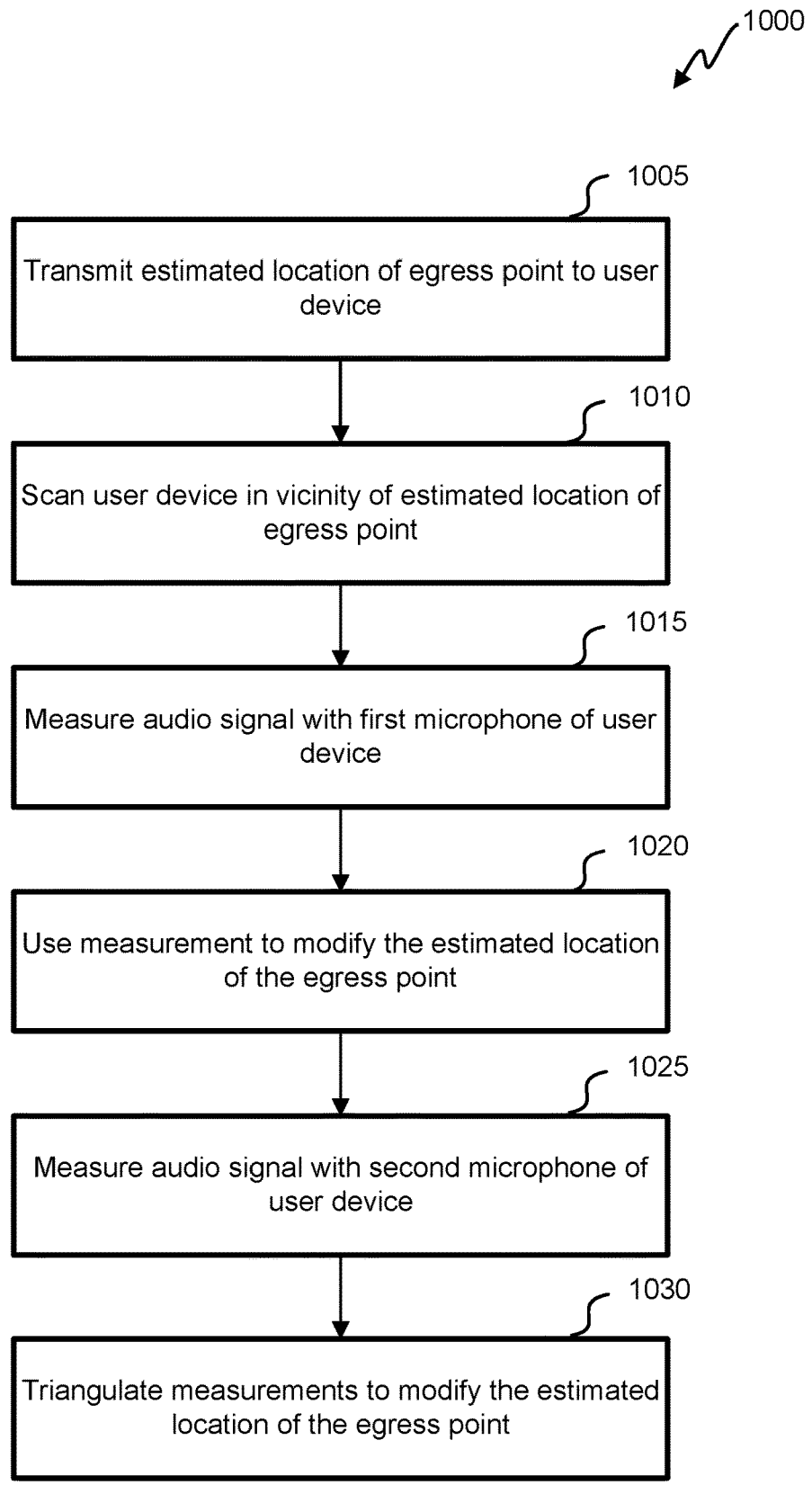
FIGS. 10-12 depict flow charts of embodiments of additional methods for localizing an egress point.

With reference to FIG. 10, an embodiment of a method 1000 for determining a location of an egress point in a plumbing system in shown. The method 1000 begins at block 1005 where an estimated location of an egress point is transmitted to the user device 130. The estimated location of the egress point may be transmitted by any suitable method, such as through network 134 and/or Internet 104. Block 1005 may be omitted if the user device 130 determines the estimated location of the egress point. The estimated location of the egress point may be determined by method 800.

A user may scan the user device 130 in an area that encompasses the estimated location of the egress point at block 1010. The user device 130 may include a first sonar microphone that is configured to measure audio signals. As water exits a pipe through a hole in the pipe, the leak may produce enough sound to be detected by the first sonar microphone at block 1015. For example, the leak may make various sounds such as a fast drip, a slow drip, or a spray. The leak may have a frequency that can provide a signature for detection. Further, an intentional egress may make various sounds, such as rushing water or rattling pipes. The user device 130 may also include a filter that enables the user to filter out sounds that are unlikely to be caused by the leak. The user device 130 may also include a speaker that is configured to produce an audible sound to assist the user in locating the egress point. For example, as the user moves the user device 130 closer to the egress point, the speaker may emit an audible sound that becomes louder, or that repeats itself at a higher frequency. Once the user device 130 has identified a position at which the audio signal is maximized, the estimated location of the egress point may be modified accordingly at block 1020.

In some embodiments, the user device 130 may include a second sonar microphone that is configured to measure audio signals. The second sonar microphone may detect the sound produced by the egress point at block 1025. Once the user device 130 has identified a position at which the audio signal is maximized, the estimated location of the egress point may be modified by triangulating the measurements from the first sonar microphone and the second sonar microphone at block 1030.

Figure 11:
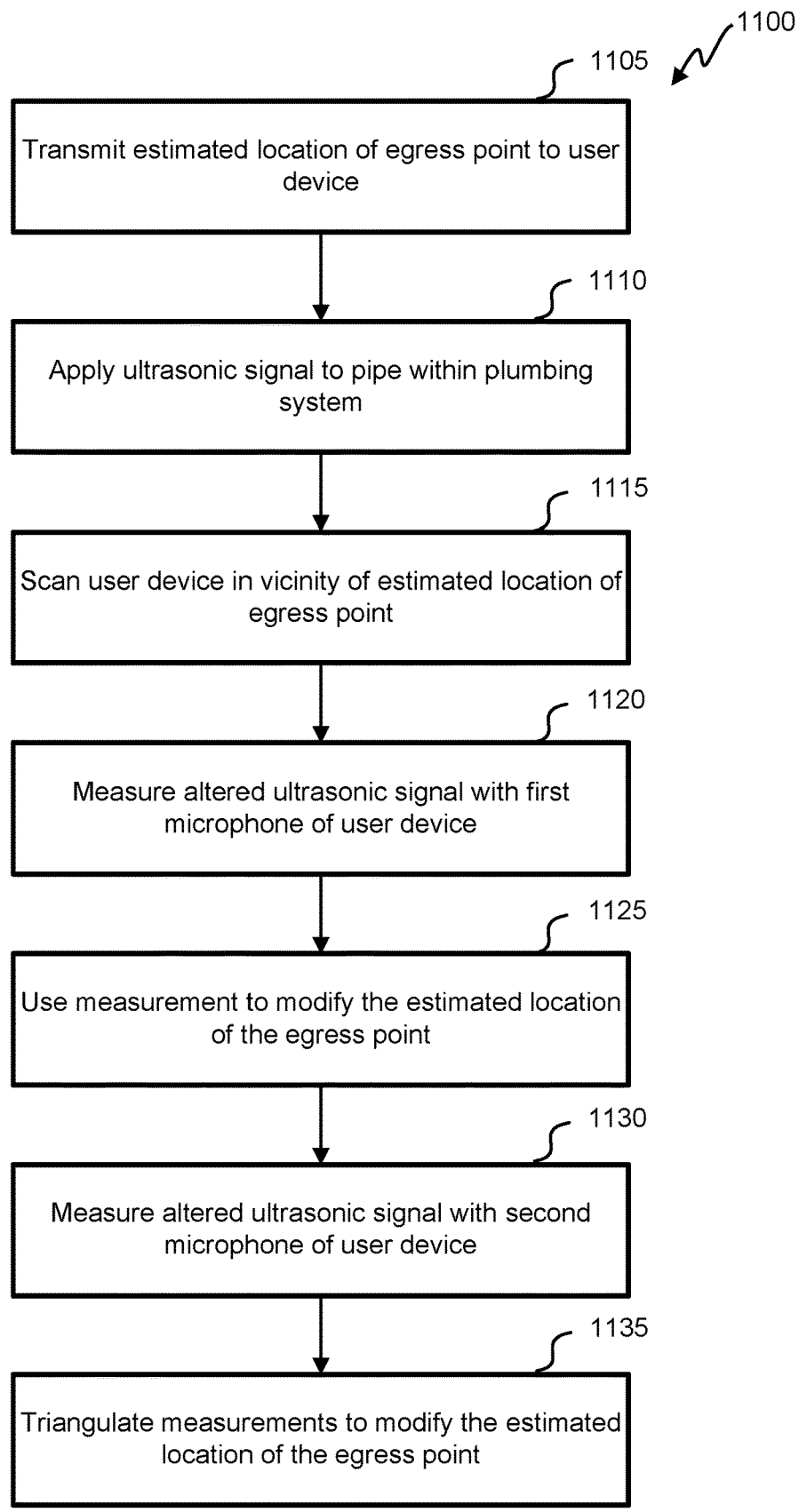

With reference to FIG. 11, an embodiment of another method 1100 for determining a location of an egress point in a plumbing system in shown. The method 1100 begins at block 1105 where an estimated location of an egress point is transmitted to the user device 130. The estimated location of the egress point may be transmitted by any suitable method, such as through network 134 and/or Internet 104. Block 1105 may be omitted if the user device 130 determines the estimated location of the egress point. The estimated location of the egress point may be determined by method 800.

An ultrasonic signal may be applied to a pipe within the plumbing system 700 at block 1110. The ultrasonic signal may be applied by a transducer within the user device 130. Alternatively, the ultrasonic signal may be applied by a transducer within the water device 120 or a standalone transducer, in which case the transducer transmits information about the ultrasonic signal to the user device 130. The information may include the frequency of the ultrasonic signal and the location and time at which the ultrasonic signal was applied. The frequency may be selected based on an estimated size of the hole in the pipe. Further, the frequency may be adjusted until a resonant frequency is identified. The information may also include any encoding of the ultrasonic signal. In addition, multiple ultrasonic signals may be applied by multiple transducers, in which the multiple ultrasonic signals may have different frequencies.

A user may scan the user device 130 in an area that encompasses the estimated location of the egress point at block 1115. The user device 130 may include a first sonar microphone that is configured to measure ultrasonic signals. When the ultrasonic signal reaches the hole in the pipe, the ultrasonic signal is altered as it escapes from the pipe through the hole. The altered ultrasonic signal may be detected by the first sonar microphone at block 1120. The user device 130 may also include a filter that enables the user to filter out sounds that are unlikely to be caused by the altered ultrasonic signal. The user device 130 may also include a speaker that is configured to produce an audible sound to assist the user in locating the egress point. For example, as the user moves the user device 130 closer to the egress point, the speaker may emit an audible sound that becomes louder, or that repeats itself at a higher frequency. Once the user device 130 has identified a position at which the altered ultrasonic signal is maximized, the estimated location of the egress point may be modified accordingly at block 1125.

In some embodiments, the user device 130 may include a second sonar microphone that is configured to measure ultrasonic signals. The second sonar microphone may detect the altered ultrasonic signal at block 1130. Once the user device 130 has identified a position at which the altered ultrasonic signal is maximized, the estimated location of the egress point may be modified by triangulating the measurements from the first sonar microphone and the second sonar microphone at block 1135. Using multiple ultrasonic signals with different frequencies may improve the accuracy of the triangulation. Alternatively or in addition, the duration between the time that the ultrasonic signal is applied and the time that the altered ultrasonic signal is measured may be used to modify the estimated location of the egress point.

Figure 12:
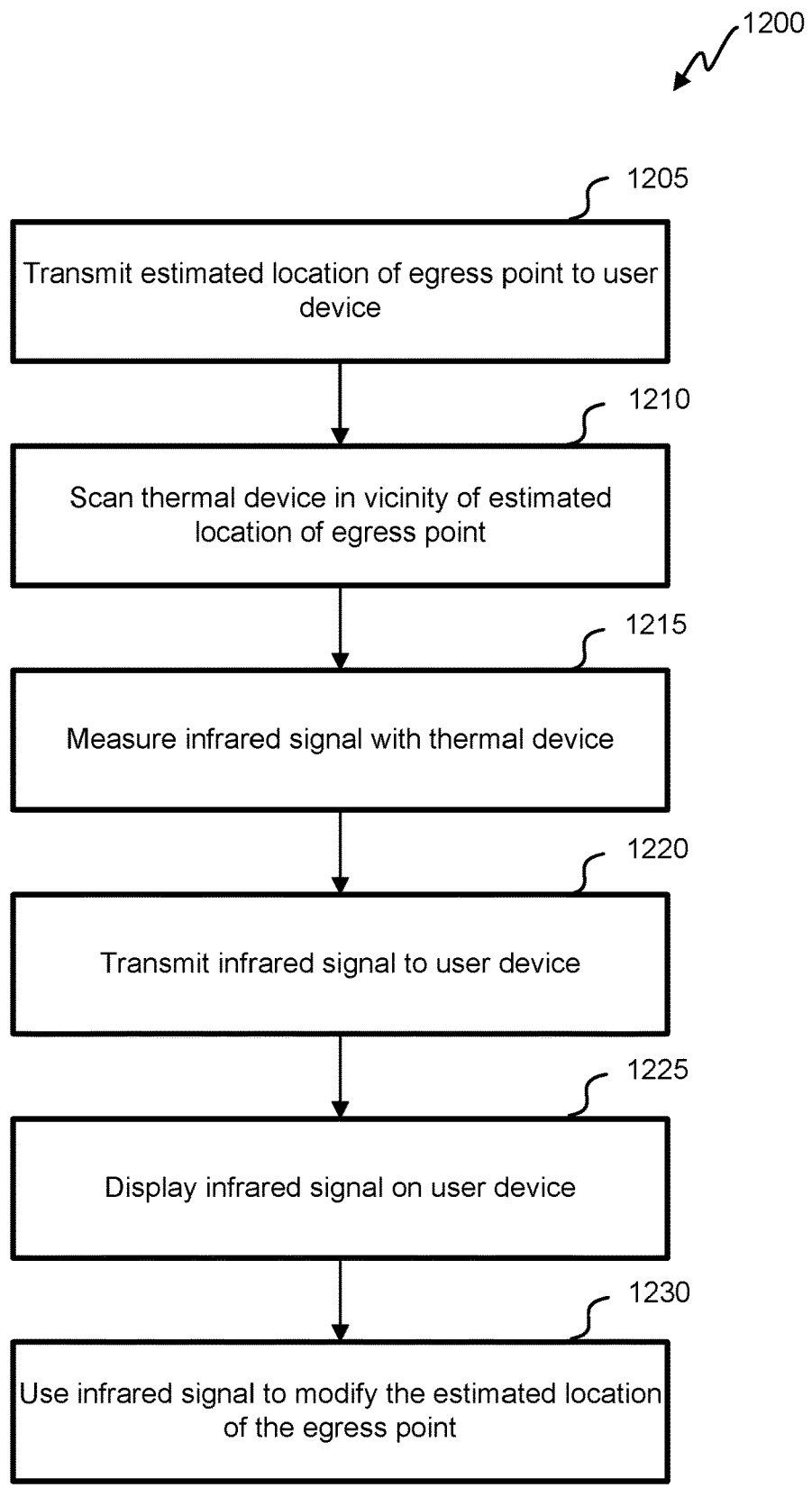

With reference to FIG. 12, an embodiment of yet another method 1200 for determining a location of an egress point in a plumbing system in shown. The method 1200 begins at block 1205 where an estimated location of an egress point is transmitted to the user device 130. The estimated location of the egress point may be transmitted by any suitable method, such as through network 134 and/or Internet 104. Block 1205 may be omitted if the user device 130 determines the estimated location of the egress point. The estimated location of the egress point may be determined by method 800.

A user may scan a thermal device in an area that encompasses the estimated location of the egress point at block 1210. The thermal device may measure an infrared signal at block 1215. As water exits a pipe through a hole in the pipe, the leak may cause a thermal transfer, such that a bloom corresponding to the location of the leak appears as a change in temperature within an infrared image acquired by the thermal device. Temperature sensors in the vicinity of the leak may be used to estimate the temperature of the water from the leak. The leak may then be identified within the infrared image according to the temperature estimate provided by the infrared image. The infrared image may also indicate the location of the pipes behind the walls if the temperature of the water in the pipes is different from the temperature of the walls. Various temperature sensors within the plumbing system may measure the temperature of the water in the pipes, and these measurements may be used in order to filter the infrared signal to remove components other than the pipes. The thermal device may transmit the infrared signal to the user device 130 at block 1220. The user device 130 may display the infrared signal at block 1225. The infrared signal may be used to modify the estimated location of the egress point at block 1230.

Figure 13:
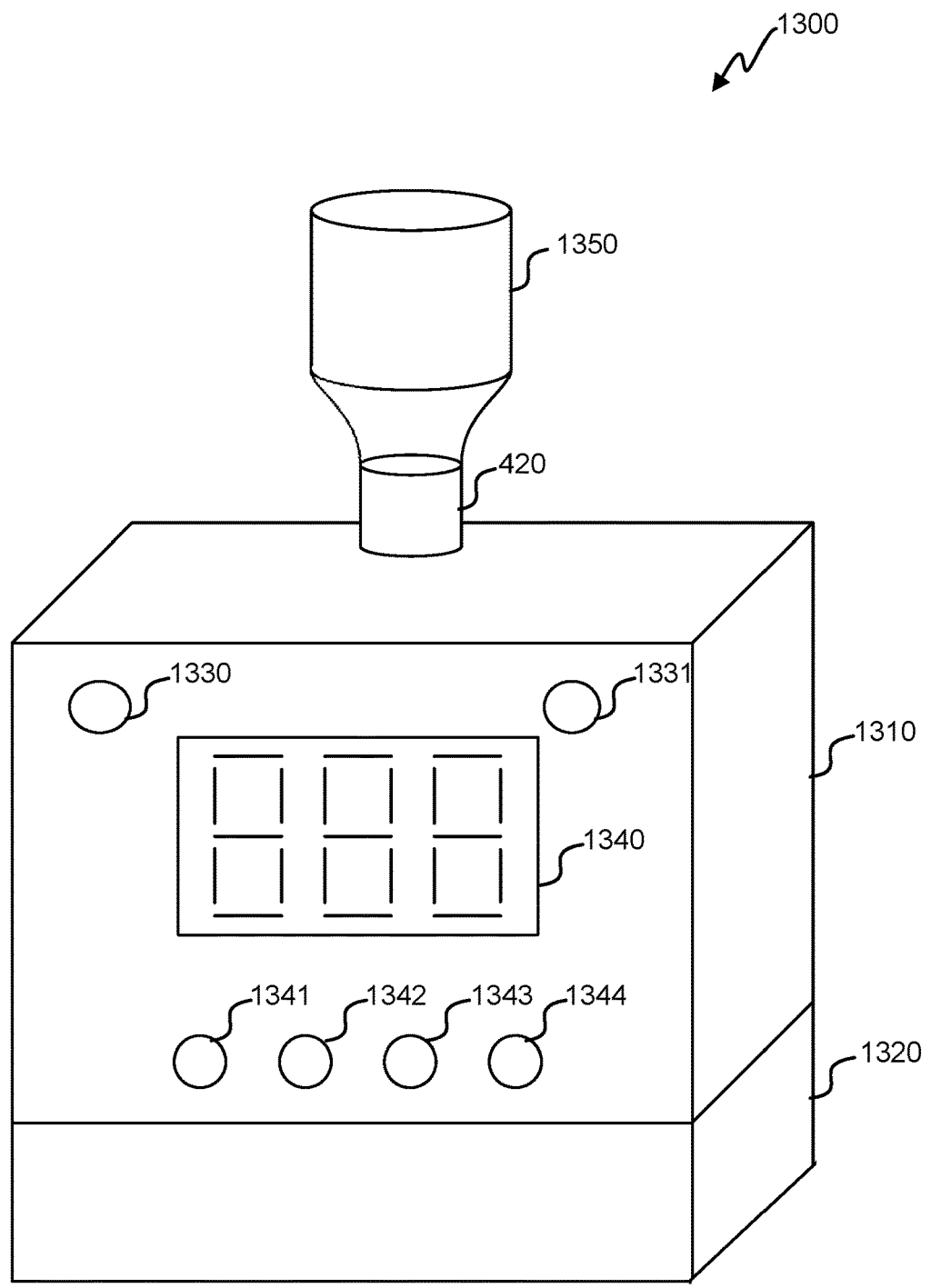
FIG. 13 depicts a block diagram of an embodiment of a portable water device.

Referring next to FIG. 13, a diagram of an embodiment of a portable water device 1300 is shown. The portable water device 1300 may be used to detect and localize egress points in a manner similar to that described above with reference to the water device 500 shown in FIG. 5. The portable water device 1300 may include some or all of the features and functions of the water device 500, and may be used in conjunction with the methods described in FIGS. 8 and 10-12. For example, the portable water device 1300 may be used to transmit and/or receive an audio or ultrasonic signal, measure a pressure signal, and/or determine an estimated location of an egress point within the plumbing system. The portable water device 1300 may be connected to the output of any water source within the plumbing system, such that it is unnecessary to remove a portion of a pipe in order to install the portable water device 1300. Further, the portable water device 1300 may be connected temporarily, and may be moved between various water sources within a plumbing system 116. For example, a home inspector may use the portable water device 1300 to test for leaks at a kitchen faucet, an outdoor spigot, a bathtub spout, a shower head, an aerator, or any other accessible water source inside or outside of a house.

The portable water device 1300 includes a body 1310 on which a display 1340 may show various numerical readings, such as water pressure, water temperature, and/or water flow. The display 1340 may cycle through these numerical readings automatically or at the instruction of a user. In addition, the body 1310 may include status indicator lights 1341, 1342, 1343, and 1344 that provide various types of information. For example, the status indicator lights 1341, 1342, 1343, and 1344 may indicate whether the portable water device 1300 has power; whether the portable water device 1300 is operational; and/or whether a leak has been detected. Although four status indicator lights are shown in FIG. 13, any suitable number of status indicator lights may be used. The body 1310 may also include buttons 1330 and 1331 that a user may press in order to perform various functions, such as turning on the portable water device 1300, starting a leak detection algorithm, indicating whether the main shutoff valve 412-1 is open or closed, etc. Although two buttons are shown in FIG. 13, any suitable number of buttons may be used.

As shown in FIG. 13, the portable water device 1300 may also include a battery 1320 that is integrated with the body 1310. The battery 1320 may be rechargeable by a wired or a wireless connection. Alternatively or in addition, the portable water device 1300 may include the power supply 220 described above. The portable water device 1300 may have a size and a weight that allow a user to hold the portable water device 1300 in a single hand. For example, the portable water device 1300 may be 10" tall, 4" wide, and 4" thick, although any other suitable dimensions may be used, as long as the portable water device 1300 can be easily carried by the user. The body 1310 of the portable water device 1300 may be made of materials that are rugged and waterproof; and the entire portable water device 1300 may be sealed.

As shown in FIG. 13, the portable water device 1300 may also include an adapter 1350 that is connected to the cold water pipe 420. Although the adapter 1350 is shown as being connected to the cold water pipe 420, the adapter 1350 may also be connected (directly or indirectly) to the hot water pipe 424. The adapter 1350 may be connected directly to the cold water pipe 420 by any suitable method, such as threading, welding, soldering, or brazing. Alternatively, a fastener or a fitting may be used to connect the adapter 1350 to the cold water pipe 420, either temporarily or permanently. A leak-free seal may be formed between the adapter 1350 and the cold water pipe 420.

Figure 14:
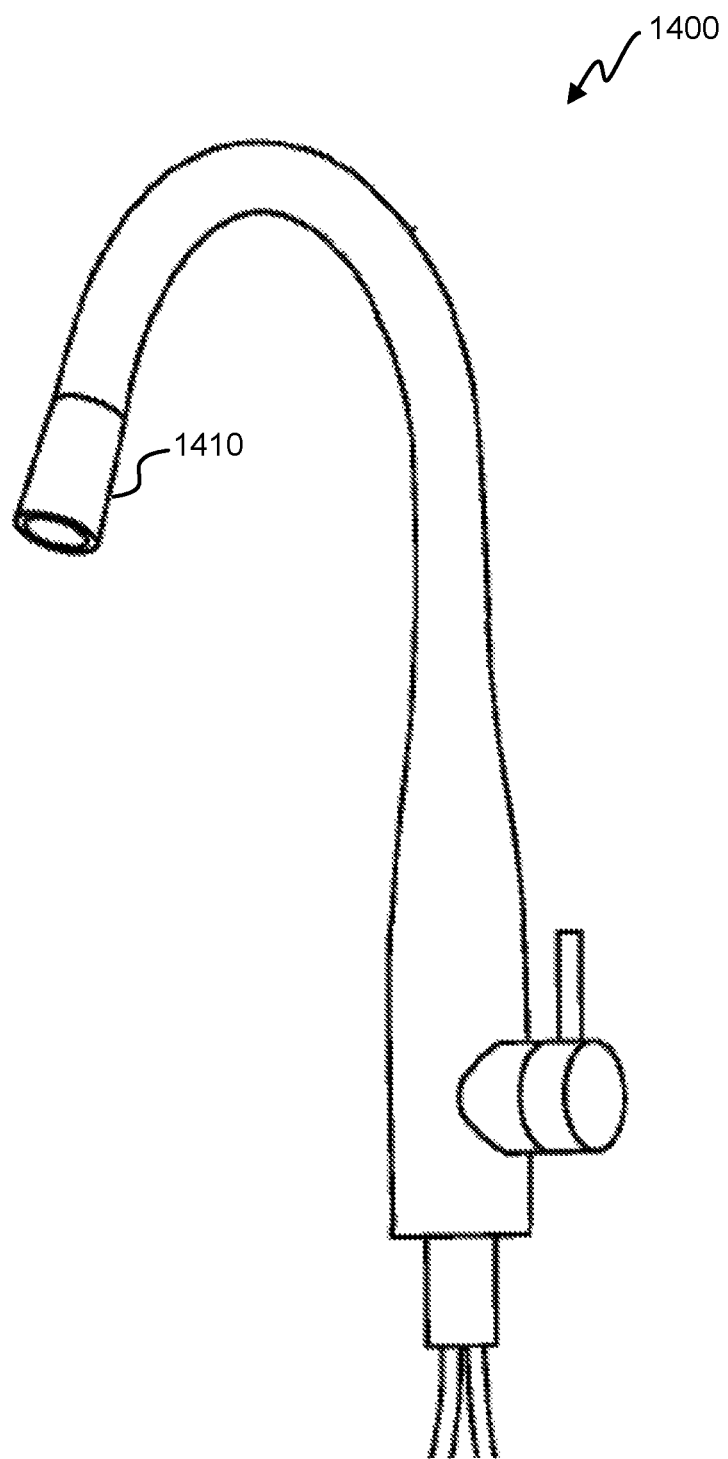
FIG. 14 depicts a diagram of an embodiment of a water source.

Referring next to FIG. 14, the adapter 1350 may be used to connect the portable water device 1300 to an accessible water source within or outside of a house. For example, the adapter 1350 may be connected with a spout 1410 of a kitchen faucet shown in FIG. 14. In this example, the adapter 1350 may slide over the spout 1410, and may include a material such as rubber that adjusts its shape to maintain a leak-free seal when connected with the spout 1410. The adapter 1350 may have an adjustable diameter, such that it may slide over faucets having different sizes. Further, the portable water device 1300 may be equipped with multiple adapters 1350 having different diameters that can be used interchangeably. Alternatively or in addition, the adapter 1350 may include a standard threading, such that the adapter can be screwed into a compatible water source, such as an outdoor spigot or a garden hose, and provide a water-tight connection. In other embodiments, hoses and additional adapters may be used to connect the adapter 1350 with various water sources. The hoses may have limited flexibility, such that they do not interfere with readings from the sensors within the portable water device 1300. For example, the hoses may be made of materials such as polyvinyl chloride (PVC) or brass.

In some embodiments, the portable water device 1300 may operate while the adapter 1350 is connected to the spout 1410 and water is flowing through the cold water pipe 420. In these embodiments, water may flow from the spout 1410 through the adapter 1350 and the cold water pipe 420, and exit the portable water device 1300 from a hole or an extension of the cold water pipe 420 at the bottom of the portable water device 1300. This allows for measurements by the temperature sensors 512-1 and 512-2, the pressure sensor 524, and the flow sensor 528 as the water passes through the cold water pipe 420.

In other embodiments, the portable water device 1300 may operate while the adapter 1350 is connected to the spout 1410, the cold water pipe 420 is filled with water, and the water within the cold water pipe 420 is in fluid communication with water within the faucet 1400. In these embodiments, the cold water pipe 420 is filled with water such that the portable water device 1300 senses the same water pressure that is present in the faucet 1400. A one-way valve 533 may be provided at the top of the cold water pipe 420 to allow water to enter the cold water pipe 420 from the adapter 1350. The shutoff valve 532 is closed to prevent water from exiting from the bottom of the cold water pipe 420, and a plurality of electrodes 529 including a reference electrode and a measurement electrode may be provided within the cold water pipe 420 to indicate when the cold water pipe 420 has been sufficiently filled with water. Alternatively, any other suitable water level sensor may be used to indicate when the cold water pipe 420 has been filled with water, such as a float, a hydrostatic device, a load cell, a magnetic level gauge, a capacitance transmitter, a magnetostrictive level transmitter, an ultrasonic level transmitter, a laser level transmitter, or a radar level transmitter. Further, one of the status indicator lights 1341, 1342, 1343, or 1344 may be turned on to indicate that the portable water device 1300 is ready to take measurements when the cold water pipe 420 has been sufficiently filled with water.

The portable water device 1300 may send various information to a remote device, such as a computer, smartphone, or other electronic device. For example, as discussed above with respect to FIG. 1, the portable water device 1300 may send information over the network 134 to a user device 130 or the cloud analyzer 108. Alternatively, the portable water device 1300 may send information to the user device 130 via a wired connection, in which case the portable water device 1300 may include a data port or an Ethernet port. The portable water device 1300 may send information such as whether a leak has been detected; where a leak has been detected; and/or single measurements of the temperature and/or pressure of the water. In addition, the portable water device 1300 may send information indicating the temperature and/or pressure of the water as a function of time. Further, the portable water device 1300 may indicate whether or not there is sufficient flow in a particular faucet. The information from the portable water device may be displayed and/or stored by an application on the remote device.

Figure 15:
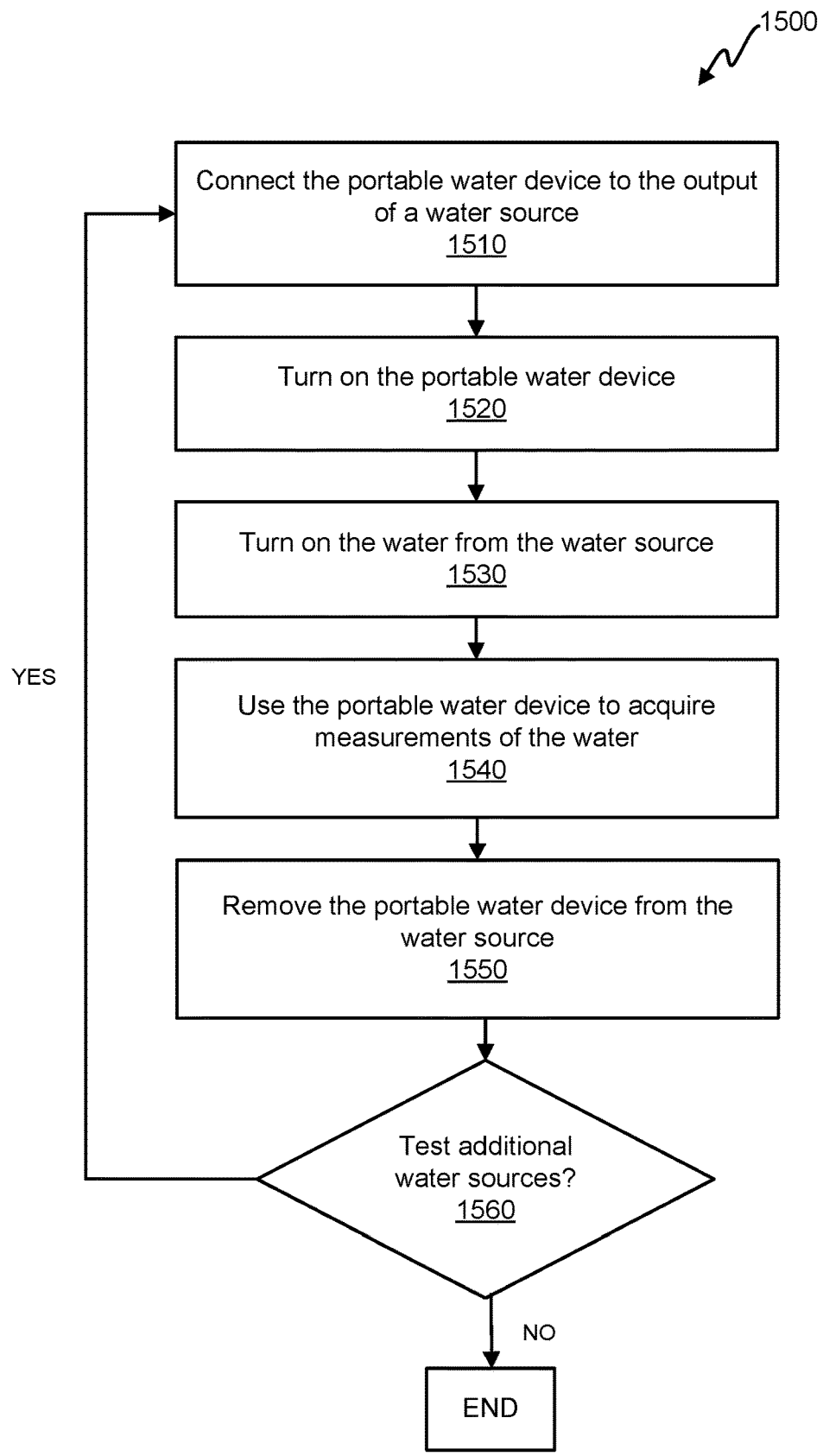
FIG. 15 depicts a flow chart of an embodiment of a method for using the portable water device.

Referring next to FIG. 15, a flowchart of an embodiment of a method 1500 for using the portable water device 1300 is shown. In this example, a home inspector may use the portable water device 1300 to obtain information about the water in one or more parts of a house by connecting the portable water device 1300 to one or more water sources inside and/or outside of the house. As shown in FIG. 15, the method 1500 begins when the home inspector connects the portable water device 1300 to the output of a water source at block 1510. The portable water device 1300 may be connected by any suitable method, such as those discussed above.

The home inspector may then turn on the portable water device 1300 at block 1520. For example, the home inspector may turn on the portable water device 1300 by pressing one of the buttons 1330 or 1331. In other embodiments, the home inspector may turn on the portable water device 1300 by starting a flow of water from the water source through the adapter 1350 and the cold water pipe 420 of the portable water device 1300. In these embodiments, the portable water device 1300 may include a blade that turns when water flows through the cold water pipe 420 and generates sufficient electricity to power the portable water device 1300.

If the water flow was not turned on in block 1520, the home inspector may then turn on the water flow from the water source at block 1530. In some embodiments, water may flow through the length of the cold water pipe 420 of the portable water device 1300 during the measurements. In other embodiments, the measurements may occur when the cold water pipe 420 is sufficiently filled with water, and the water is stationary within the cold water pipe 420. In these embodiments, the plurality of electrodes 529 may determine when the cold water pipe 420 has been sufficiently filled with water, and send a signal to light one of the status light indicators 1341, 1342, 1343, or 1344. The home inspector may turn off the flow of water from the water source in response to the activation of the status light indicator 1341, 1342, 1343, or 1344.

The home inspector may then instruct the portable water device 1300 to start acquiring measurements at block 1540. For example, the home inspector may instruct the portable water device 1300 to start acquiring measurements by pressing one of the buttons 1330 or 1331. In other embodiments, the home inspector may instruct the portable water device 1300 to start acquiring measurements by using an application on a smartphone that is connected to the portable water device 1300 over a wireless connection, such as a cellular network or a WiFi network. The home inspector may use the buttons 1330 or 1331 or the application on the smartphone to indicate which measurements should be taken, and in which order the measurements should be taken. The status light indicators 1341, 1342, 1343, or 1344 or the application on the smartphone may indicate when the desired measurements have been completed.

The home inspector may then remove the portable water device 1300 from the water source at block 1550. If necessary, the home inspector may turn off the water flow from the water source before removing the portable water device 1300. The home inspector may remove the portable water device 1300 by any suitable method, such as unscrewing a threaded connection and/or applying downward pressure to release the adapter 1350 from the spout 1410.

The home inspector may then decide whether to test any additional water sources in the house at decision block 1560. If there are additional water sources to test, the method begins again at block 1510. When there are no more water sources to test, the method is complete. A processor within the portable water device 1300 may analyze the collected measurements and send the raw data and/or the results of the analysis to a transceiver within the portable water device 1300. The transceiver may then send the raw data and/or the results of the analysis to a network, a cloud analyzer, and/or a user device, such as the smartphone.

The smartphone may include an application that obtains position information corresponding to the location where the portable water device 1300 takes the measurements. The application may also access a database of other houses near the location, and display characteristics of the other houses and their water systems. In addition, the application may allow the home inspector to input characteristics of the house that is being tested, and suggest tests to run based on the characteristics.

In addition to the measurements discussed above, the portable water device 1300 can be modified to take various other measurements to characterize the water in a plumbing system. For example, the portable water device 1300 may be modified to incorporate a home-testing kit for contaminants such as bacteria, lead, pesticides, iron, copper, nitrates, nitrites, and chlorine. The portable water device 1300 may be modified to incorporate a home-testing kit for total dissolved solids, pH, alkalinity, and/or hardness.

In addition, the portable water device 1300 may be used to evaluate and/or calibrate a water meter for a building, such as a house. For example, the portable water device 1300 may measure the water flow at a water source near the water meter. This reading may be compared with the water flow reported by the water meter. Calibrating the water meter may ensure that the customer is not overcharged by the water company for water usage that is calculated based on the water flow.

Further, the portable water device 1300 may be used to assess whether the water within a pipe is susceptible to freezing and causing the pipe to burst. For example, the portable water device 1300 may be connected to an outdoor spigot or an indoor faucet near a pipe that is positioned along an exterior wall. A temperature measurement near 32° F. may indicate that the water is close to freezing. Further, a pressure measurement that is higher than normal may indicate that some of the water in the pipe has already frozen and caused a partial ice blockage. Similarly, the portable water device 1300 may also be used to identify a clog within a pipe, based on a pressure measurement that is higher than normal.

In addition, the portable water device 1300 may be used to evaluate the performance of a water heater. For example, the portable water device 1300 may be connected to a water source whose hot water is supplied by the water heater. The portable water device 1300 may then measure the temperature of the water as a function of time. The data may be analyzed to determine how long it takes for the water to become hot, and how long the supply of hot water lasts. The data may also be analyzed to determine whether the temperature of the water is consistent over time, or whether it needs to be stabilized. This method may be used to evaluate the performance of a standard water heater or a tankless water heater.

Further, the portable water device 1300 may be used to assess the capacity of the plumbing system to provide sufficient water pressure during times of high usage. For example, the portable water device 1300 may be connected to a water source within a house, and the water pressure may be measured as a function of time while the water is turned on for various additional water sources. The water may be turned on incrementally for the various additional water sources. This method may be used to determine whether a water storage tank is necessary to ensure a consistent water pressure during times of high usage.

The portable water device 1300 may also be used to identify a failure or potential failure of a specific fixture, based on the measured pattern profile of the fixture. In addition, the portable water device 1300 may be used to identify hammering in a specific pipe, based on the measured pattern profile of a water source that is supplied by the pipe.

A number of variations and modifications of the disclosed embodiments can also be used. For example, the plumbing analyzer can be used to monitor any liquid distributed in pipes. This could include industrial plants, sprinkler systems, gas distribution systems, refineries, hydrocarbon production equipment, municipal water distribution, etc. The plumbing system is a closed system with pressurized liquid (e.g., a gas) that is released in a selective and controlled manner using valves.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for determining a location of an egress point in a plumbing system that includes a branched system of pipes within a building, the system comprising:
   a first sensor that is configured to measure a first pressure signal as a function of time at a first location within the plumbing system;
   a second sensor that is configured to measure a second pressure signal as a function of time at a second location within the plumbing system, wherein the plumbing system includes multiple branch points between the first location and the second location;
   a processor that is configured to:
      determine a measured temporal difference between a first pressure drop in the first pressure signal and a second pressure drop in the second pressure signal; and
      use the measured temporal difference to determine an estimated location of the egress point in the plumbing system, wherein:
   the estimated location of the egress point is determined by comparing the measured temporal difference with a database of calibrated temporal differences for a plurality of fixtures within the plumbing system,
   the estimated location of the egress point is between a first fixture and a second fixture within the plumbing system, and
   the egress point corresponds to a leak in a pipe; and
   a first portable microphone that is configured to measure an alteration of an ultrasonic signal applied to the pipe within the plumbing system, wherein the ultrasonic signal propagates through the egress point by being used to scan an area that encompasses the estimated location of the egress point,
      wherein the processor is further configured to use a position at which the altered ultrasonic signal is maximum and a duration between a time the ultrasonic signal is applied to the pipe and a time the altered ultrasonic signal is measured, to modify the estimated location of the egress point.

2. The system of claim 1, further comprising:
   a second portable microphone that is configured to measure an audio signal by being used to scan an area that encompasses the estimated location of the egress point,
   wherein the processor is further configured to use the audio signal to modify the estimated location of the egress point.

3. The system of claim 1, further comprising:
   a transducer that is configured to apply the ultrasonic signal to the pipe within the plumbing system.

4. The system of claim 1, further comprising:
   a portable scanner that is configured to measure an infrared signal by scanning an area that encompasses the estimated location of the egress point,
   wherein the processor is further configured to use the infrared signal to modify the estimated location of the egress point.

5. The system of claim 1, wherein the estimated location of the egress point is determined by determining that the measured temporal difference has a value between a first calibrated temporal difference for the first fixture and a second calibrated temporal difference for the second fixture.

6. A method for determining a location of an egress point in a plumbing system that includes a branched system of pipes within a building, the method comprising:
   measuring a first pressure signal as a function of time at a first location within the plumbing system;
   measuring a second pressure signal as a function of time at a second location within the plumbing system, wherein the plumbing system includes multiple branch points between the first location and the second location;
   determining a measured temporal difference between a first pressure drop in the first pressure signal and a second pressure drop in the second pressure signal;
   using the measured temporal difference to determine an estimated location of the egress point in the plumbing system, wherein:
      the estimated location of the egress point is determined by comparing the measured temporal difference with a database of calibrated temporal differences for a plurality of fixtures within the plumbing system,
      the estimated location of the egress point is between a first fixture and a second fixture within the plumbing system, and
      the egress point corresponds to a leak in a pipe;
   measuring an alteration of an ultrasonic signal applied to the pipe within the plumbing system, wherein the ultrasonic signal propagates through the egress point by being used to scan an area that encompasses the estimated location of the egress point; and
   using a position at which the altered ultrasonic signal is maximum and a duration between a time the ultrasonic signal is applied to the pipe and a time the altered ultrasonic signal is measured, to modify the estimated location of the egress point.

7. The method of claim 6, further comprising:
   measuring an audio signal by scanning an area that encompasses the estimated location of the egress point; and
   using the audio signal to modify the estimated location of the egress point.

8. The method of claim 6, further comprising:
   applying the ultrasonic signal to the pipe within the plumbing system.

9. The method of claim 6, further comprising:
   measuring an infrared signal by scanning an area that encompasses the estimated location of the egress point; and
   using the infrared signal to modify the estimated location of the egress point.

10. The method of claim 6, wherein the estimated location of the egress point is determined by determining that the measured temporal difference has a value between a first calibrated temporal difference for the first fixture and a second calibrated temporal difference for the second fixture.

11. A machine-readable medium for determining a location of an egress point in a plumbing system that includes a branched system of pipes within a building, the machine-readable medium having machine-executable instructions configured to:
   measure a first pressure signal as a function of time at a first location within the plumbing system;
   measure a second pressure signal as a function of time at a second location within the plumbing system, wherein the plumbing system includes multiple branch points between the first location and the second location;
   determine a measured temporal difference between a first pressure drop in the first pressure signal and a second pressure drop in the second pressure signal;
   use the measured temporal difference to determine an estimated location of the egress point in the plumbing system, wherein:

the estimated location of the egress point is determined by comparing the measured temporal difference with a database of calibrated temporal differences for a plurality of fixtures within the plumbing system, the estimated location of the egress point is between a first fixture and a second fixture within the plumbing system, and the egress point corresponds to a leak in a pipe measure an alteration of an ultrasonic signal applied to the pipe within the plumbing system, wherein the ultrasonic signal propagates through the egress point by being used to scan an area that encompasses the estimated location of the egress point; and use a position at which the altered ultrasonic signal is maximum and a duration between a time the ultrasonic signal is applied to the pipe and a time the altered ultrasonic signal is measured, to modify the estimated location of the egress point.

12. The machine-readable medium of claim 11, wherein the machine-executable instructions are further configured to:

measure an audio signal by scanning an area that encompasses the estimated location of the egress point; and use the audio signal to modify the estimated location of the egress point.

13. The machine-readable medium of claim 11, wherein the machine-executable instructions are further configured to:

apply the ultrasonic signal to the pipe within the plumbing system.

14. The machine-readable medium of claim 11, wherein the machine-executable instructions are further configured to:

measure an infrared signal by scanning an area that encompasses the estimated location of the egress point; and use the infrared signal to modify the estimated location of the egress point.

15. The machine-readable medium of claim 11, wherein the estimated location of the egress point is determined by determining that the measured temporal difference has a value between a first calibrated temporal difference for the first fixture and a second calibrated temporal difference for the second fixture.

* * * * *